(12) United States Patent
Pedersen

(10) Patent No.: US 12,041,407 B2
(45) Date of Patent: *Jul. 16, 2024

(54) CHARGING KIT FOR CHARGING ONE OR MORE RECHARGEABLE HEARING DEVICES

(71) Applicant: GN Hearing A/S, Ballerup (DK)

(72) Inventor: Morten Lerstrup Pedersen, Copenhagen (DK)

(73) Assignee: GN HEARING A/S, Ballerup (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/320,045

(22) Filed: May 18, 2023

(65) Prior Publication Data
US 2023/0292030 A1 Sep. 14, 2023

Related U.S. Application Data

(63) Continuation of application No. 17/540,845, filed on Dec. 2, 2021, now Pat. No. 11,818,530.

(30) Foreign Application Priority Data

Jan. 8, 2021 (DK) .......................... PA 2021 70010

(51) Int. Cl.
*H04R 1/10* (2006.01)
*H02J 7/00* (2006.01)
*H04R 25/00* (2006.01)

(52) U.S. Cl.
CPC .......... *H04R 1/1025* (2013.01); *H02J 7/0044* (2013.01); *H04R 25/602* (2013.01); *H04R 2225/31* (2013.01)

(58) Field of Classification Search
None
See application file for complete search history.

(56) References Cited

U.S. PATENT DOCUMENTS 5,256,954 A * 10/1993 Chen ..................... H02J 7/0045
320/113
5,610,494 A * 3/1997 Grosfilley ............. H02J 7/0044
381/322

(Continued)

FOREIGN PATENT DOCUMENTS

| CN | 111447522 | 7/2020 |
| DE | 29718104 | 1/1998 |

(Continued)

OTHER PUBLICATIONS

Non-Final Office Action for U.S. Appl. No. 17/540,845 dated Nov. 10, 2022.

(Continued)

*Primary Examiner* — Mark Fischer
(74) *Attorney, Agent, or Firm* — Vista IP Law Group, LLP

(57) ABSTRACT

The disclosure relates to a charging kit for charging one or more rechargeable hearing devices being configured to be worn by a user. The charging kit comprises a base charger being configured to receive a first model specific insert, the base charger comprising a transmitter charging element, where the first model specific insert is adapted to removably receive at least a first model specific hearing device of the one or more hearing devices, the first model specific hearing device comprising a first receiver charging element. The transmitter charging element is arranged in the base charger on an adjustable support.

19 Claims, 16 Drawing Sheets

(56) References Cited

U.S. PATENT DOCUMENTS

| | | | |
|---|---|---|---|
| 2008/0118093 A1 | 5/2008 | Klemenz et al. | |
| 2009/0202093 A1* | 8/2009 | Dannemann | H02J 7/0044 |
| | | | 381/323 |
| 2015/0188356 A1 | 7/2015 | Chen et al. | |
| 2017/0347182 A1* | 11/2017 | Chawan | B65D 25/02 |
| 2019/0238007 A1 | 8/2019 | Bober et al. | |

FOREIGN PATENT DOCUMENTS

| | | |
|---|---|---|
| EP | 3373593 | 9/2018 |
| WO | WO 2020139402 | 7/2020 |

OTHER PUBLICATIONS

Amendment Response to NFOA for U.S. Appl. No. 17/540,845 dated Feb. 3, 2023.
Notice of Allowance for U.S. Appl. No. 17/540,845 dated Feb. 24, 2023.
Extended European Search Report for EP Patent Appln. No. 22150178.6 dated May 27, 2022.
1st Technical Examination for Danish Patent Appln. No. PA 2021 70010 dated Jul. 8, 2021.

* cited by examiner

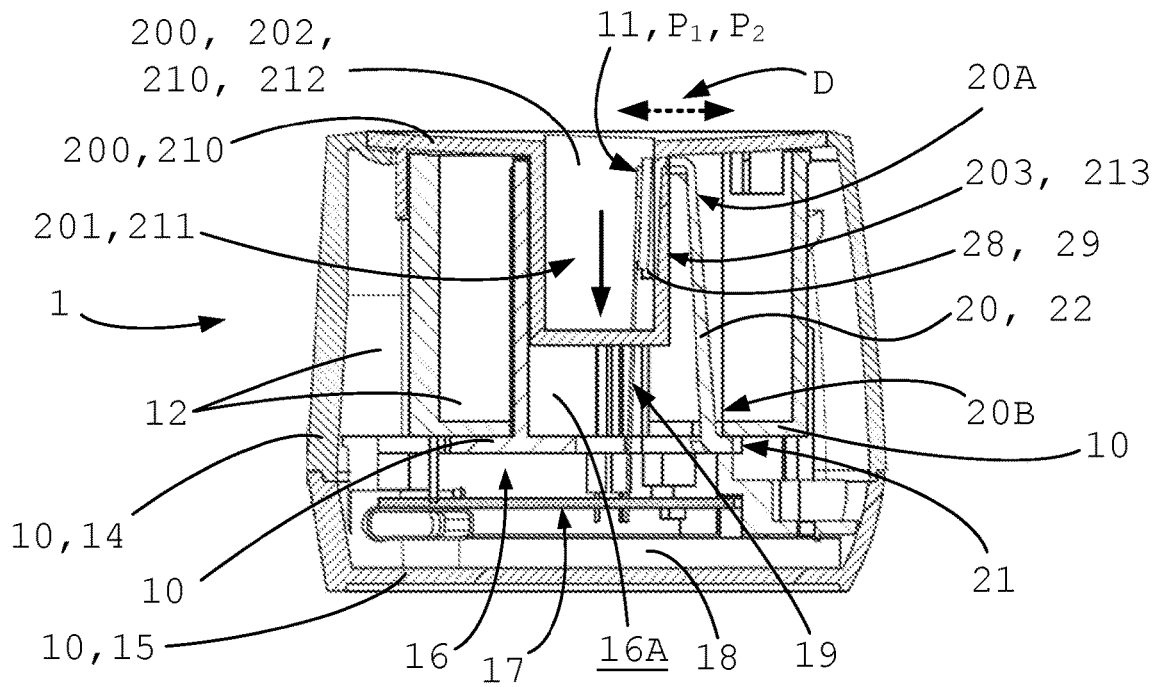
Fig 8A (A-A)
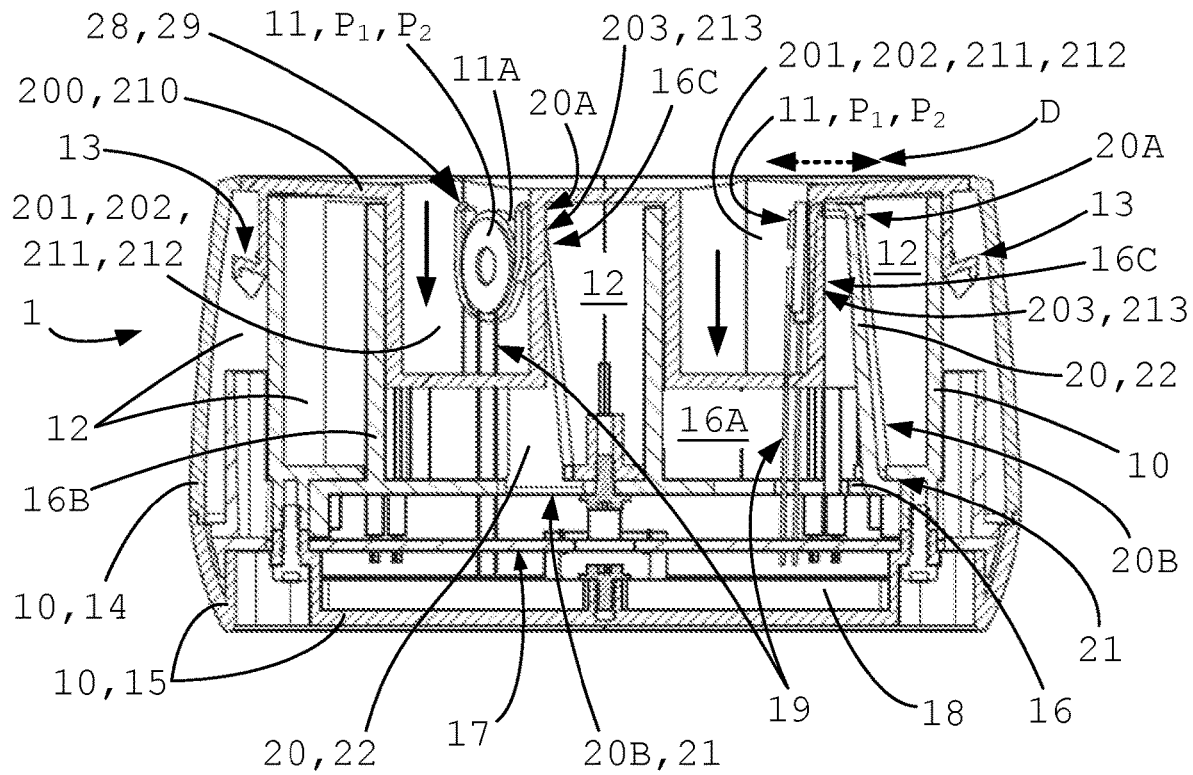
Fig 8B (B-B)

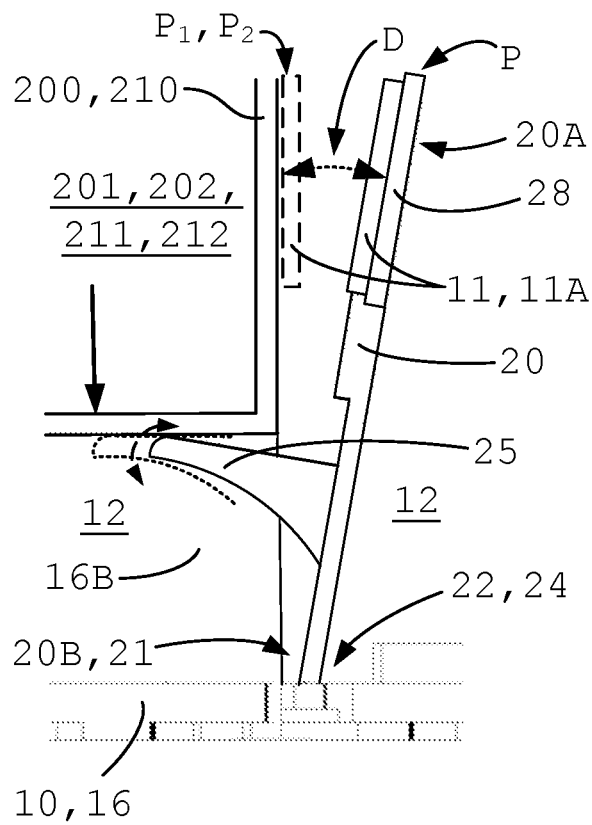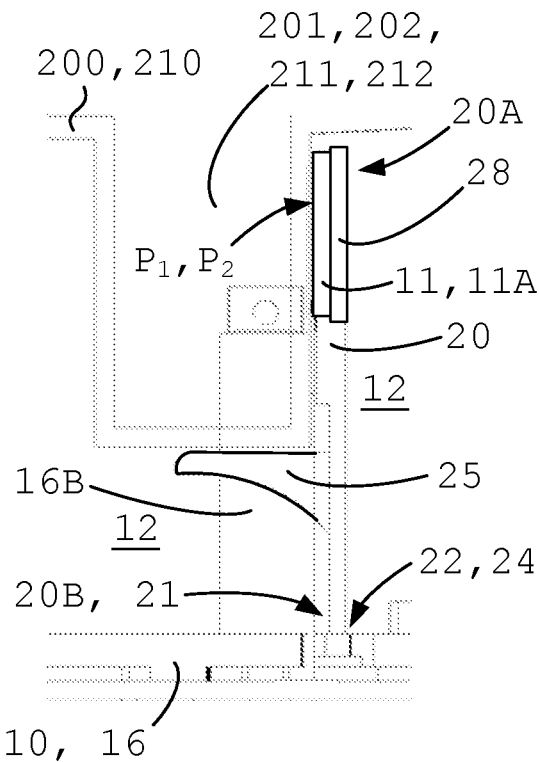
Fig 13A
Fig 13B
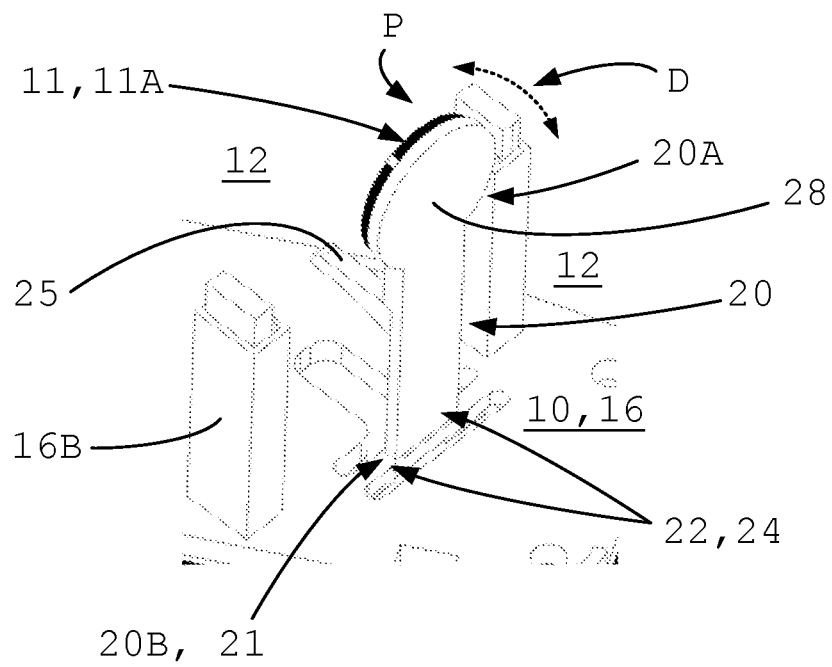
Fig 13C

CHARGING KIT FOR CHARGING ONE OR MORE RECHARGEABLE HEARING DEVICES

RELATED APPLICATION DATA

This application is a continuation of U.S. patent application Ser. No. 17/540,845 filed on Dec. 2, 2021, pending, which claims priority to, and the benefit of, Danish Patent Application No. PA2021 70010 filed on Jan. 8, 2021. The entire disclosures of the above applications are expressly incorporated by reference herein.

FIELD

The present disclosure relates to a charging kit for charging one or more rechargeable hearing devices. More specifically, the disclosure relates to a charging kit or assembly for charging one or more rechargeable hearing devices as defined in the introductory parts of independent claim/-s.

BACKGROUND ART

To remove the need for charging batteries in a hearing device, hearing devices are designed to be rechargeable. As such, hearing devices are often equipped with rechargeable batteries that can be recharged in a hearing device charger, while the batteries are still in the hearing device. To charge the hearing device, the hearing device is inserted into an insert cavity of the hearing device charger. For effective charging of the hearing device, the hearing device is held in a charging position in the hearing device charger, such that the receiver charging element in the hearing device is placed close to the transmitter charging element in the charger.

A problem with the solutions of the prior art is that each hearing aid charger for this reason only supports hearing aids having a specific form factor, i.e. specific outer dimensions. This result in a great number of chargers on the market to support charging of e.g. different generations of hearing aids or that the hearing aid manufacture is locked to a specific outer design in order to supply hearing aids usable with current chargers on the market. A further problem with the solution of the prior art is that the charger manufacturer has to store spare parts and support repairs of many different hearing device chargers.

There is thus a need for an improved hearing aid charger design, which can be easily adapted to support hearing aids with different outer dimensions, such as hearing devices of different shapes and sizes, and provides effective charging.

SUMMARY

It is an object of the present disclosure to mitigate, alleviate or eliminate one or more of the above-identified deficiencies and disadvantages in the prior art and solve at least the above-mentioned problem.

In one aspect, one or more of the above objects are achieved by means of a charging kit or assembly to charge hearing devices, as claimed in the associated independent claim, preferred variants thereof being defined in associated dependent claims.

According to a first aspect there is provided a charging kit for charging one or more rechargeable hearing devices, the hearing device being configured to be worn by a user, the charging kit comprising a base charger being configured to receive a first model specific insert, the base charger comprising a transmitter charging element, where the first model specific insert is adapted to removably receive at least a first model specific hearing device of the one or more hearing devices, the first model specific hearing device comprising a first receiver charging element, characterized in that the transmitter charging element is arranged in the base charger on an adjustable support being configured to provide an adaptable positioning of the transmitter charging element, whereby the transmitter charging element is configured to be urged (or biased) towards the first model specific insert when the first model specific insert is placed in (and/or inserted into) the base charger thereby enabling energy to be transferrable from the transmitter charging element to the first receiver charging element of the first model specific hearing device when placed in the first model specific insert.

According to some embodiments, the base charger is configured to receive a second model specific insert, where the second model specific insert is adapted to removably receive at least a second model specific hearing device of the one or more hearing devices, the second model specific hearing device comprising a second receiver charging element, and wherein the adjustable support of the transmitter charging element is adapted to provide the adaptable positioning of the transmitter charging element, so that the transmitter charging element is configured to be urged (or biased) towards the second model specific insert when the second model specific insert is placed in (and/or inserted into) the base charger enabling energy to be transferrable from the transmitter charging element to the second receiver charging element of the second model specific hearing device when the second model specific hearing device is placed in the second model specific insert.

According to some embodiments, the base charger comprises a cavity configured to mate with the first model specific insert and/or the second model specific insert, and/or each model specific insert comprises at least one model specific insert cavity configured to mate with the first or second model specific hearing device, respectively.

According to some embodiments, the first and/or second model specific insert or each of the first and/or second model specific insert comprises two model specific insert cavities of which each model specific insert cavity is configured to mate with one of a pair of the first model specific hearing devices or to mate with one of a pair of the second model specific hearing devices.

According to some embodiments, at least one of the first model specific hearing devices and/or at least one of the second model specific hearing devices is configured for wireless charging. Wireless charging may be obtained by means of inductive coupling, capacitive coupling, magnetic coupling, radio frequencies, light waves and/or sound waves, etc. In case the wireless charging is obtained by means of inductive coupling, the transmitter charging element(s) may be one or more transmitter coils and the receiver charging element(s) may be one or more receiver coils, such as respectively one or more inductive transmitter coils and one or more inductive receiver coils.

According to some embodiments, one or more or all of the first and/or the second model specific hearing devices is/are inductively chargeable.

According to some embodiments, the base charger comprises a cavity configured to mate with the first model specific insert and/or a/the second model specific insert, and the transmitter charging element is arranged to be positioned at a start (or base) position in the cavity of the base charger before the first model specific insert is placed in the base charger, and the transmitter charging element is configured to be displaced to a first position by the first model specific insert and to act with a bias or urging force towards the first model specific insert when the first model specific insert is placed in (and/or inserted into) the base charger, the first position being different from the start (or base) position.

According to some embodiments, the transmitter charging element is configured to be displaced to the first position to align with the first receiver charging element of the first model specific hearing device, when the first model specific hearing device is placed in the first model specific insert in the base charger, and to act with a bias or urging force towards the first model specific insert and the first receiver charging element of the first model specific hearing device.

According to some embodiments, the base charger comprises a cavity configured to mate with the first model specific insert and/or a/the second model specific insert, and the transmitter charging element is arranged to be positioned at the start (or base) position in the cavity of the base charger before the second model specific insert is placed in the base charger, and the transmitter charging element is configured to be displaced to a second position by the second model specific insert and to act with a bias or urging force towards the second model specific insert when the second model specific insert is placed in the base charger, the second position being different from the start (or base) position.

According to some embodiments, the transmitter charging element is configured to be displaced to the second position to align with the second receiver charging element of the second model specific hearing device, when the second model specific hearing device is placed in the second model specific insert in the base charger, and to act with a bias or urging force towards the second model specific insert and the second receiver charging element of the second model specific hearing device.

According to some embodiments, the first distance between the start (or base) position and the first position is shorter, equal to or longer than the second distance between the start (or base) position and the second position.

According to some embodiments, the adjustable support comprises an elastic element configured to make the transmitter charging element of the base charger movable between different positions in the base charger and able to act with a bias or urging force towards or against or into contact with the first model specific insert or the second model specific insert when the first or second model specific insert is placed in the base charger.

According to some embodiments, the elastic element of the adjustable support make the transmitter charging element of the base charger movable between different positions in the base charger, when the first or second model specific hearing device is placed in the first or second model specific insert in the base charger, and able to act with a bias or urging force towards or against or into contact with the first receiver charging element of the first model specific hearing device, when the first model specific hearing device is placed in the first model specific insert in the base charger, and able to act with a bias or urging force towards or against or into contact with the second receiver charging element of the second model specific hearing device, when the second model specific hearing device is placed in the second model specific insert in the base charger.

According to some embodiments, the base charger comprises a cavity configured to mate with the first model specific insert and/or a/the second model specific insert, and the adjustable support comprises an elongated body with a first free end and a second end opposite the first free end, whereby the transmitter charging element is arranged on the first free end of the adjustable support and the second end of the adjustable support is attached or connected to a guide or attachment point in the base charger, and the first free end of the adjustable support is arranged movable/displaceable in the cavity of the base charger.

According to some embodiments, the elongated body of the adjustable support comprises or is the elastic element.

According to some embodiments, the adjustable support comprises an elastic element arranged at least partly between the first free end and the second end to exert a push force urging the first free end of the adjustable support and/or the transmitter charging element inside the base charger in a direction being substantially perpendicular or perpendicular to the direction of insertion of the first model specific insert and/or the second model specific insert.

According to some embodiments, the adjustable support comprises an elastic element arranged at least partly between the first free end and the second end to exert a push force urging the first free end of the adjustable support and/or the transmitter charging element inside the base charger in a direction being inclined or substantially in parallel with or in parallel with the direction of insertion of the first model specific insert and/or the second model specific insert.

According to some embodiments, the base charger comprises one or more insert receiving cavities, whereby the first free end of the adjustable support and/or the transmitter charging element are/is arranged at least partly in or fully outside the insert receiving cavities of the base charger.

According to some embodiments, the base charger comprises one or more insert receiving cavities in which the model specific inserts with the model specific insert cavities are received, whereby the first free end of the adjustable support and/or the transmitter charging element are/is arranged at least partly in or fully outside the model specific insert cavities.

According to some embodiments, the base charger comprises one or more insert receiving cavities in which the model specific inserts with the model specific insert cavities are received, whereby the first free end of the adjustable support and/or the transmitter charging element are/is arranged at least partly in or fully outside the model specific insert cavities and the insert receiving cavities of the base charger.

According to some embodiments, each of the model specific insert cavities of the first or second model specific inserts is defined by an insert cavity wall and wherein each insert cavity comprises one or more through holes, wherein the first free end of the adjustable support and/or the transmitter charging element are/is arranged at least partly in one or more of the through holes when one of the first and/or second model specific inserts is placed in the base charger.

According to some embodiments, the elastic element of the adjustable support is arranged at least partly restrained between the first free end and the second end to be pretensioned to exert the bias or urging force.

According to some embodiments, the elastic element is configured to extend along the elongated body of the adjustable support and to enclose or encompass or surround or cover at least a part of the outer surface of the elongated body of the adjustable support.

According to some embodiments, the elastic element comprises at least one helical spring or at least one leaf spring or the elastic element is made up of at least one helical spring or at least one leaf spring.

According to some embodiments, the elastic element comprises or is made up of at least two leaf springs arranged in a sandwiched or laminated manner.

According to some embodiments, the elastic element is made of metal or plastic or any combination of those materials.

According to some embodiments, the helical or leaf spring of the elastic element is made of metal or plastic or any combination of those materials.

According to some embodiments, the first free end of the adjustable support comprising the transmitter charging element is a hinged or pivotable part of the elongated body of the adjustable support.

According to some embodiments, the transmitter charging element is connected to the first free end of the adjustable support via a pivot or hinge.

According to some embodiments, the adjustable support comprises a protruding member or arm or lever arranged between the first free end and the second end, the protruding member being configured to be engaged by any of the first or second model specific insert when any of the first or second model specific insert is introduced into the base charger, whereby the first free end and the transmitter charging element is urged (or bias) towards the model specific insert.

According to some embodiments, the second end of the adjustable support is pivotally attached to the frame of the base charger via a torsion hinge.

According to some embodiments, the adjustable support comprises a compressible element arranged at least partly between the first free end and the transmitter charging element to provide a flexibility and/or a tolerance adaptability and/or to exert a bias or urging force urging the first free end of the adjustable support and/or the transmitter charging element away from each other and/or towards the first or second model specific insert, when the first or second model specific insert is placed in the base charger, in a direction being substantially perpendicular or perpendicular to the direction of insertion of the first model specific insert and/or the second model specific insert. Alternatively, the direction may be substantially in parallel with or in parallel with or inclined to the direction of insertion of the first model specific insert and/or the second model specific insert.

The charging kit or assembly is defined herein as a hearing device charger comprising at least a base charger and a hearing device model specific insert without a hearing device, i.e. when no hearing device is placed in the associated hearing device model specific insert of the hearing device charger. The base charger of the hearing device charger could be defined as a base charging station. When one or more hearing devices are placed in the associated hearing device model specific insert of the hearing device charger, the charging kit or assembly, i.e. the hearing device charger also comprises the hearing device as any charging of the hearing device is not possible to perform before placing a hearing device in the hearing device charger. The hearing device or pair of hearing devices may be embodied in various housing styles or form factors for example as so-called Behind-the-ear (BTE) hearing device, Receiver-in-the-ear (RIE) hearing device, Receiver-in-the Canal (RIC) hearing device, Microphone-and-Receiver-in ear (M&RIE) hearing device. The hearing device or pair of hearing devices may preferably comprise at least a signal processor configured to compensate for the users hearing loss.

The above described solution(s) disclose(s) a hearing device charger based on a product platform comprising a base charger useable with a number of different hearing device model specific inserts. This removes the need of development of a new hearing aid charger every time the outer dimensions on a new type or generation of hearing aids is different from the existing ones. To support charging of a new hearing aid with different outer dimension by means of the same base charger only a new model specific insert is needed therein.

The disclosed solution(s) enable(s) dislocating of the transmitter charging element in a hearing device charger dependent on which hearing device model specific insert is placed in the charger. The disclosed solution(s) provide(s) hearing device chargers with e.g. two, three, four or even up to ten or more different hearing device model specific inserts, each model specific insert being suitable for holding an associated type or model or group of models of hearing devices due to differing specific outer dimension, such as size and/or shape, for each hearing device.

The disclosed solution(s) ensure(s) that the distance between and the positions of the transmitter charging element in the hearing device charger and the receiver charging element in any of the different hearing devices is optimal to provide effective charging when placed in the model specific insert inside the hearing device charger as the transmitter charging element is movable in the hearing device charger to adapt its placement to the shape and size of the selected model specific hearing device insert and associated hearing device.

Hereby is provided a hearing device charger both being able to support hearing aids with different outer dimensions and to provide effective charging.

A further advantage is that the disclosed solution(s) provide(s) enable(s) keeping/maintaining the symmetry for different hearing device model specific inserts when placed in one or in the same or in one and the same or in a common hearing device charger.

Yet a further advantage is that the base charger may be returned to the manufacturing site and reused multiple times by exchanging one model specific insert with another. Another advantage is that the base charger may be refurbished multiple times by being adapted to different model specific hearing devices with model specific inserts, such as when introducing a new generation of hearing aids to the market. This enables exchange of the housing and other outer/user accessible parts of the base charger as well due to health regulations.

The model specific insert is preferably mounted in the charger during the assembly of the hearing device charger at the manufacturing site.

A model specific hearing device may be part of a hearing device family, wherein all model specific hearing devices in the hearing device family are configured to be used with/fit in the same hearing device model specific insert.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and appended claim, the articles "a", "an", "the", and "said" are intended to mean that there are one or more of the elements unless the context explicitly dictates otherwise.

Thus, for example, reference to "a unit" or "the unit" may include several devices, and the like. Furthermore, words like "comprising", "including", "containing" and similar wordings does not exclude other elements or steps. Moreover, reference to a first or a second model specific insert also mean referring to a first model specific insert already assembled in the base charger, which first model specific insert is replaced by another model specific insert being for example a third or fourth or fifth model specific insert as the base charger is adapted to receive different types of model specific inserts, i.e. one different model specific insert at a time. These different types of model specific inserts that the base charger is configured to receive could e.g. be a first type of model specific insert or a second type of model specific insert or a third type of model specific insert or a fourth type of model specific insert, i.e. any suitable n:th type of model specific insert.

The present disclosure relates to different aspects including the system/kit/assembly described above and in the following, and corresponding system parts, methods, devices, systems, kits, uses and/or product means, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

FIG. 8A shows a side plane view of a cross-section along line A-A in FIG. 5B of a hearing device charger (with a model specific insert) according to an embodiment of the present disclosure.

FIG. 8B shows a side plane view of a cross-section along line B-B in FIG. 5B of the hearing device charger in FIG. 8A according to an embodiment of the present disclosure.

FIG. 13A shows a side view of a cross-section of a part in a base charger of a hearing device charger (without model specific inserts) according to an embodiment of the present disclosure.

FIG. 13B shows a side view of a cross-section of the part in the base charger of FIG. 13A when a model specific insert is received or has been received in the base charger to form a hearing device charger according to an embodiment of the present disclosure.

FIG. 13C shows a perspective top view (seen towards the top/upper surface/side) of the part of the base charger in FIG. 13A (without model specific inserts) according to an embodiment of the present disclosure.

DETAILED DESCRIPTION

Figure 1A:
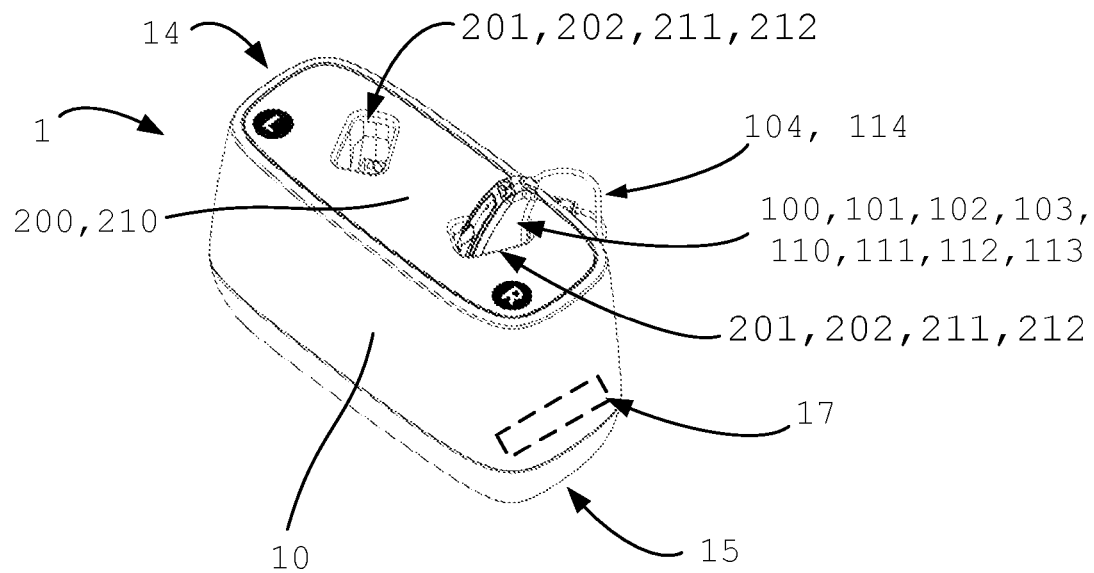
FIG. 1A shows an example of a charging kit, i.e. hearing device charger with one hearing device inserted therein in perspective according to an embodiment of the present disclosure.
Figure 1B:
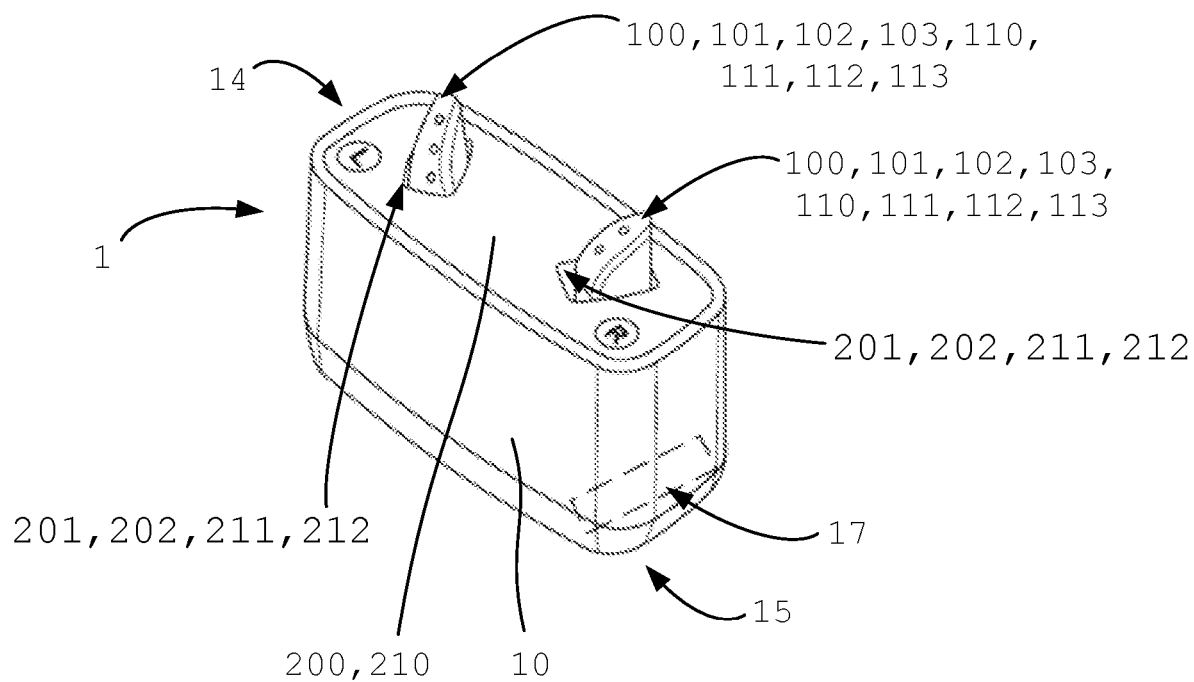
FIG. 1B shows an example of a charging kit, i.e. hearing device charger with two or a pair of hearing devices inserted therein in perspective according to an embodiment of the present disclosure.

The present disclosure will now be described with reference to the accompanying drawings 1A to 14, in which preferred example embodiments of the disclosure are shown. The disclosure may, however, be embodied in other forms and should not be construed as limited to the herein disclosed embodiments/examples. The disclosed embodiments are provided to fully convey the scope of the disclosure to the skilled person. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiment/-s even if not so illustrated, or if not so explicitly described. Throughout, the same reference numerals are used for identical or corresponding parts.

FIGS. 1A to 3B show a first aspect of this disclosure being a charging kit or assembly 1, i.e. a hearing device charger, for charging one or more rechargeable hearing devices 100, 110. The hearing devices could be one or a first hearing device 100 as in FIGS. 1A, 2A and 3A (shown before insertion of a second hearing device or before removing a first one already in the charging kit 1) and/or a first pair 100 of hearing devices as in FIGS. 1B, 2B and 3B (shown after insertion of two hearing devices or before removing one or both from the charging kit 1). The hearing devices could be another or a second hearing device 110 and/or a second pair 110 of hearing devices. The hearing devices could be a first hearing device 100 and/or a first pair 100 of hearing devices and/or a second hearing device 110 and/or a second pair 110 of hearing devices. In some embodiments, the first hearing device 100 is different from the second hearing device 110. In some embodiments, the first pair of hearing devices 100 is different from the second pair of hearing devices 110. In some embodiments, the first pair of hearing devices 100 comprises hearing devices that are different from each other. In some embodiments, the second pair of hearing devices 110 comprises hearing devices that are different from each other. In some embodiments, the first hearing device 100 and/or first pair of hearing devices 100 is different from the second hearing device 110 and/or the second pair of hearing devices 110. The differences between hearing devices 100, 110 could be in size, shape, color, texture, functionality and/or type/model/generation, e.g. for adults or children.

The hearing device(s) 100, 110 is/are configured to be worn by a user. The hearing devices 100, 110 may comprise a processing unit configured to compensate for a hearing loss of the user of the hearing devices. The charging kit 1 comprises a base charger 10 configured to receive one or more model specific inserts 200, 210. In some embodiments, the base charger 10 comprises one or more transmitter charging elements 11. One or each hearing device 100, 110 comprises a BTE housing 103, 113 configured for placement behind the user's left or right ear, and at least one rechargeable battery 102, 112 for powering the hearing device 100, 110. One or each hearing device 100, 110 may further comprise a hook or an ear plug 104, 114 configured for placement at least partly inside the user's left or right ear canal. FIGS. 1A, 2A, 2B, 3A and 3B show an ear plug 104, 114 comprising a receiver module. FIG. 2B shows an ear plug 104, 114 comprising a receiver module and a dome attached to a free end of the receiver module. In some embodiments, the base charger 10 comprises one or more transmitter charging elements 11 for each hearing device 200, 210. Each model specific insert 200, 210 is adapted to removable receive at least one model specific hearing device 100, 110, i.e. adapted to removably receive the BTE housing 103, 113 of the model specific hearing device 100, 110. In some embodiments, each model specific insert 200, 210 is adapted to removable receive two or a pair of model specific hearing devices 100, 110, i.e. adapted to removably receive the BTE housing 103, 113 of the two or pair of model specific hearing devices 100, 110. A model specific hearing device 100, 110 comprises at least one receiver charging element 101, 111. In some embodiments, each model specific hearing device 100, 110 comprises at least one receiver charging element 101, 111. The transmitter charging element(s) 11 is/are configured to charge the hearing device(s) 100, 110 via the receiver charging element(s) 101, 111. The base charger 10 comprises at least one cavity 12, an attachment 13 for holding a model specific insert 200, 210, a charger housing and a frame 16, 16B that could be partly exposed or be arranged fully and non-exposed inside the charger housing of the base charger, see FIGS. 1A to 1C, 3A, 3B, and 5A to 6C and 8A to 14. The charger housing may comprise a top/upper surface or housing 14, and a bottom/lower surface or housing 15, see FIGS. 1A to 1C, 2A, 2B, 3A, 3B, 5A, 5B, 6C, 8A and 8B. In FIGS. 1A, 1B and 2A to 3B, each of the model specific hearing device(s) 100, 110 comprises at least one BTE housing 103, 113 and at least one hook or ear plug 104, 114. The first hearing device(s) 100 comprises a first BTE housing 103 and a hook or ear plug 104, see FIGS. 1A. 1B and 2A to 3B. The second hearing device(s) 110 comprises a second BTE housing 113 and a hook or ear plug 114, see FIGS. 2B and 3B. Each ear plug 104, 114 may be connected to a BTE housing 103, 113 via a tube and/or wire, see FIGS. 1A and 2A to 3B. The ear plug 104, 114 may be connected to the BTE housing 103, 113 via the tube and/or wire at one end, see FIGS. 1A and 2A to 3B, and the ear plug may be connected to a dome at the other end, see FIG. 2B.

The transmitter charging element(s) 11 is/are arranged in the base charger 10 on an adjustable support 20 being configured to provide an adaptable positioning of the transmitter charging element, see FIGS. 1C and 4A to 14. The transmitter charging element(s) 11 may be supported by a support plate 11A. The support plate 11A may be made from a hard and/or brittle material. The support plate 11A may be made from ferrite. The transmitter charging element 11 of the base charger 10 in the hearing device charger 1 is configured to be urged/bias towards a first model specific insert 200 when the first model specific insert is placed in and/or inserted into the base charger 10. This enables energy to be transferrable from the transmitter charging element(s) 11 to the first receiver charging element(s) 101 of the first model specific hearing device 100 when the first model specific hearing devise, e.g. the BTE housing 103 of the first model specific hearing device, is placed in the first model specific insert 200 of the hearing device charger 1.

In some embodiments, the same goes for a second model specific insert 210 in that the adjustable support(s) 20 of the transmitter charging element(s) 11 in the base charger 10 of the hearing device charger 1 is/are adapted to provide the adaptable positioning of the transmitter charging element(s), see FIGS. 1C and 4A to 14. The transmitter charging element 11 is configured to be urged/biased towards a second model specific insert 210 when the second model specific insert is placed in and/or inserted into the base charger 10. As above, this enables energy to be transferrable from the transmitter charging element(s) 11 to the second receiver charging element(s) 111 of the second model specific hearing device 110 when the second model specific hearing device, e.g. the BTE housing 113 of the second model specific hearing device, is placed in the second model specific insert 210 of the hearing device charger 1.

Figure 14:
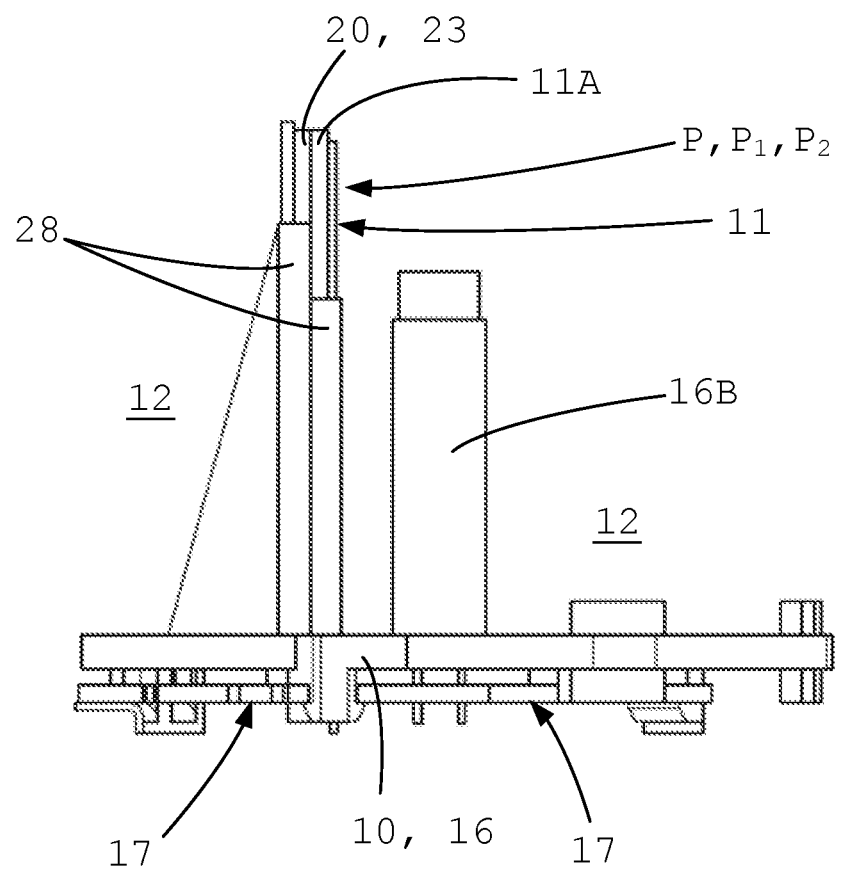
FIG. 14 shows a side view of a part in a base charger of a hearing device charger (without model specific inserts) according to an embodiment of the present disclosure.

In some embodiments, the transmitter charging element(s) 11 is/are configured to be urged/biased or moved by being pushed and/or pulled in direction(s) towards the receiver charging element(s) 101, 111 of the model specific hearing device(s) 100, 110 for adapting to its/their different shape(s) and size(s) etc., see FIGS. 1C and 4A to 14. This is done for pressing the transmitter and receiver charging element(s) 11, 101, 111 with sufficient force towards each other to ensure correct distance(s) between them that provide secure and effective/reliable charging. In some embodiments, the charging element(s) 11, 101, 111 or at least the transmitter charging element(s) 11, press/-es towards the associated model specific insert(s) 200, 210 or each other while not being in physical contact with each other. In some embodiments, the charging element(s) 11, 101, 111 press/-es against and in physical contact with the associated model specific insert(s) 200, 210 and/or each other. These directions, reference D, of urging and/or biasing and/or moving and/or pushing and/or pulling between different positions P, $P_1$, and $P_2$ are visualized by dotted/solid lines and arrows and the different distances between these positions are referenced as $d_1$ and $d_2$ in FIGS. 4A and 4B, and as D, P, $P_1$, and $P_2$ in e.g. FIGS. 5A, 5B, 6A to 6C, 7A to 7C, 8A to 8D, 9A to 9B, 10A to 10B, 11A to 11B, 12, and 13A to 13C. In FIG. 14, the urging or biasing or movement of the transmitter element 11 to adapt to different model specific inserts 200, 210 (not shown) and hearing devices 100, 110 (not shown) is done in such small scale by use of a compressible element(s) 23 of the adjustable support(s) 20, such as rubber or foam in the form of a plate(s)/pad(s), e.g. made of Poron®, that no arrow visualises those small movements and changing distances and positions P, $P_1$, and $P_2$ for the transmitter charging element(s) 11. In this embodiment, the adjustable support(s) 20 may be the compressible element(s) 23. In FIGS. 1C, 6B, 6C, 7A to 7C, 8A, 8B, 10B, 11B, 13A, a vertical arrow in solid lines pointing down visualizes the movement of a model specific insert 200, 210 when inserted into or removed out in the opposite direction from the base charger 10. FIGS. 1A to 5B, 6B, 6C, 7A to 7C, 8A, 8B, 10B, 11B, 13B show the model specific insert(s) 200, 210 when inserted, i.e. when received and/or assembled in the base charger 10 to form the hearing device charger 1, this movement is principally applicable to all figs./embodiments when inserting or removing a model specific insert 200, 210.

Each model specific insert 200, 210 comprises at least one model specific cavity 201, 211 configured to mate with at least one of the first or second model specific hearing devices 100, 110, respectively, see FIGS. 1A to 5B, 6B, 6C, 7A to 7C, 8A to 8B, 10B, 11B, and 13A to 13B.

Figure 1C:
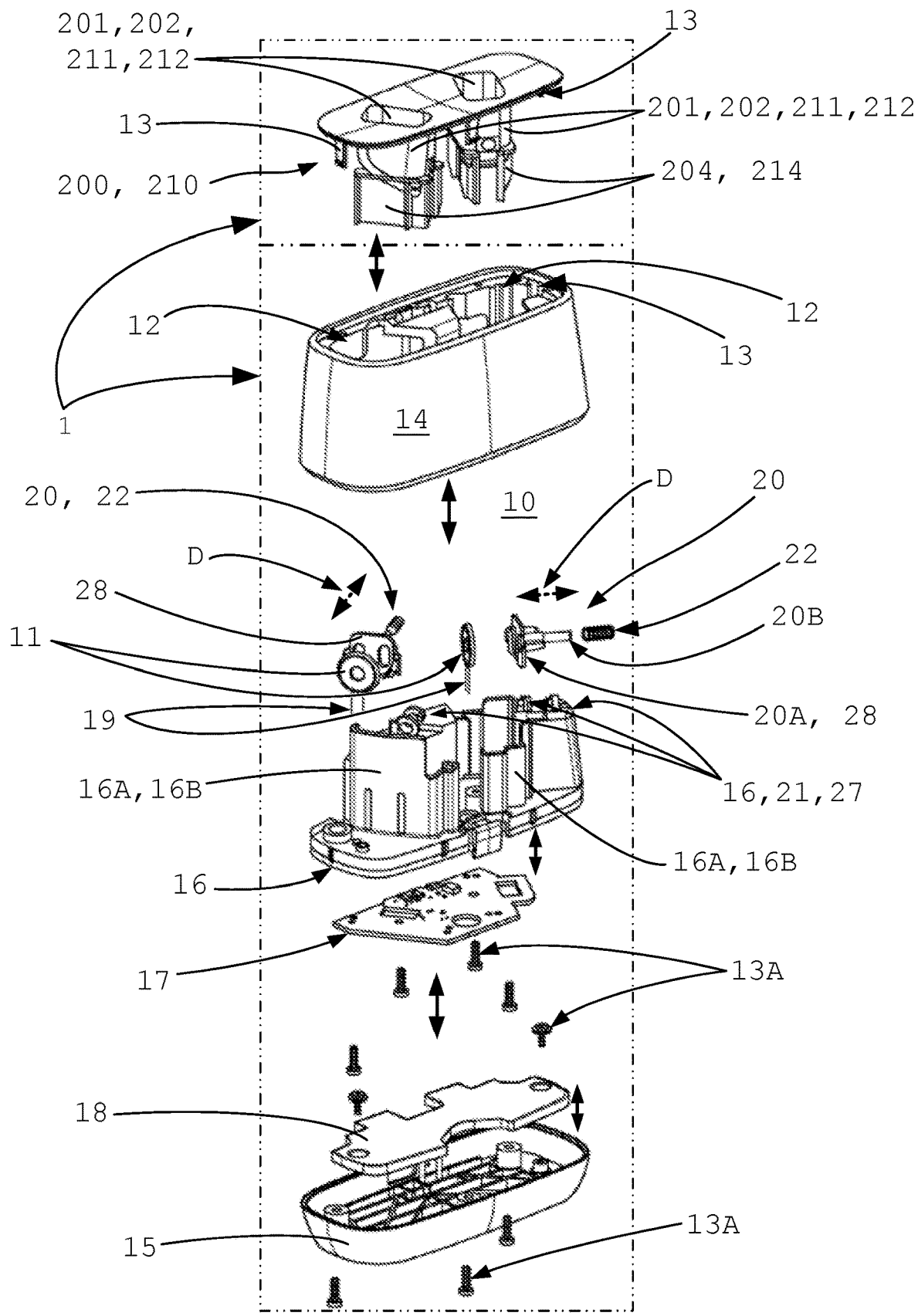
FIG. 1C shows an example of a charging kit, i.e. hearing device charger with no hearing devices inserted therein in an exploded view before or after disassembly according to an embodiment of the present disclosure.
Figure 2A:
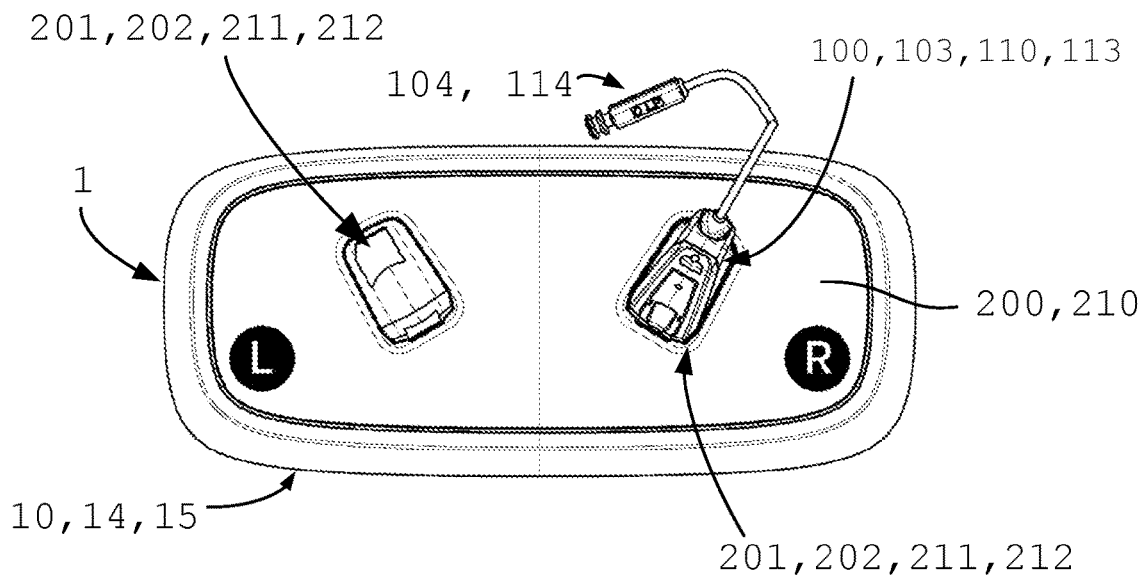
FIG. 2A shows the hearing device charger of FIG. 1A in a top plane view (towards top/upper surface/side of the hearing device charger) according to an embodiment of the present disclosure.
Figure 2B:
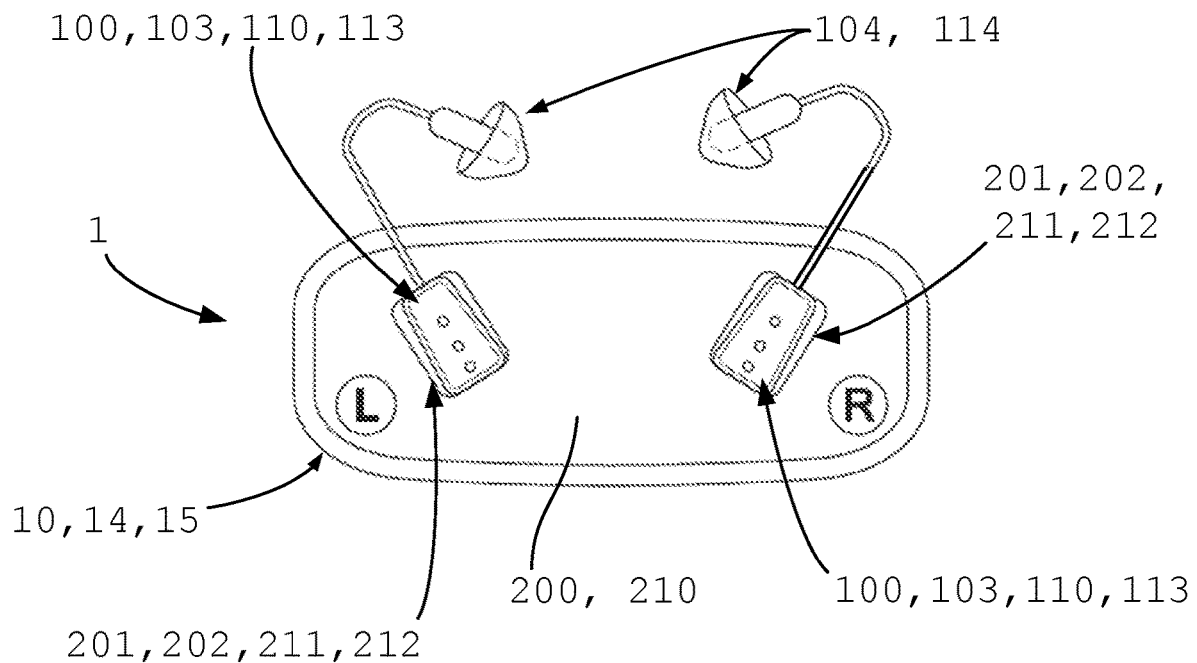
FIG. 2B shows the hearing device charger of FIG. 1B in a top plane view (towards top/upper surface/side of the hearing device charger) according to an embodiment of the present disclosure.
Figure 3A:
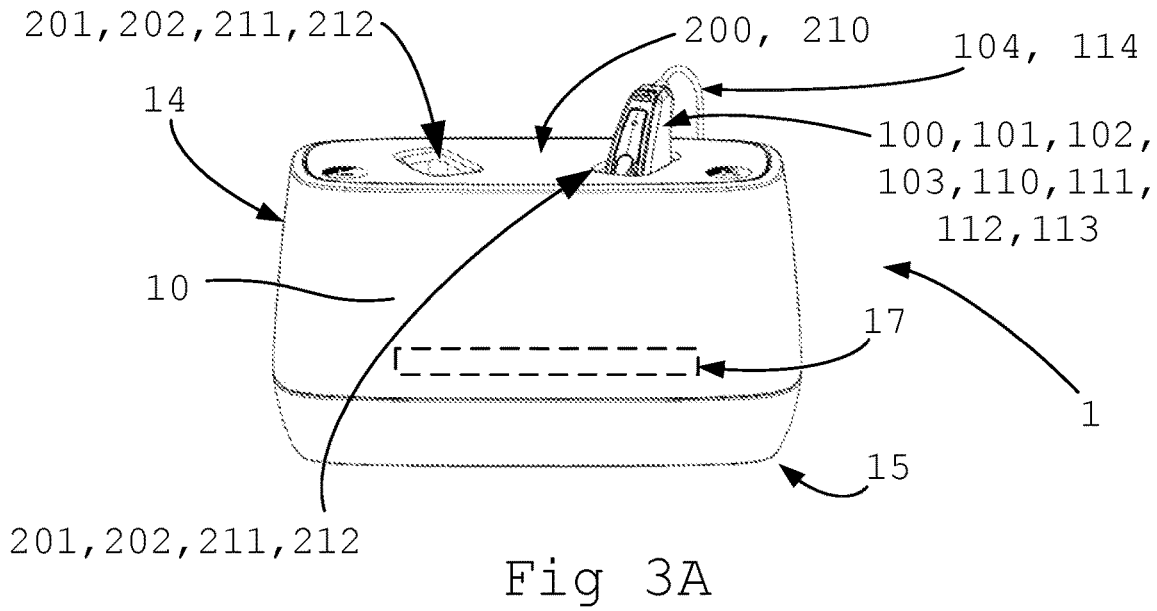
FIG. 3A shows a side view of the hearing device charger of FIGS. 1A and 2A in a direction from the left of FIG. 1A according to an embodiment of the present disclosure.
Figure 3B:
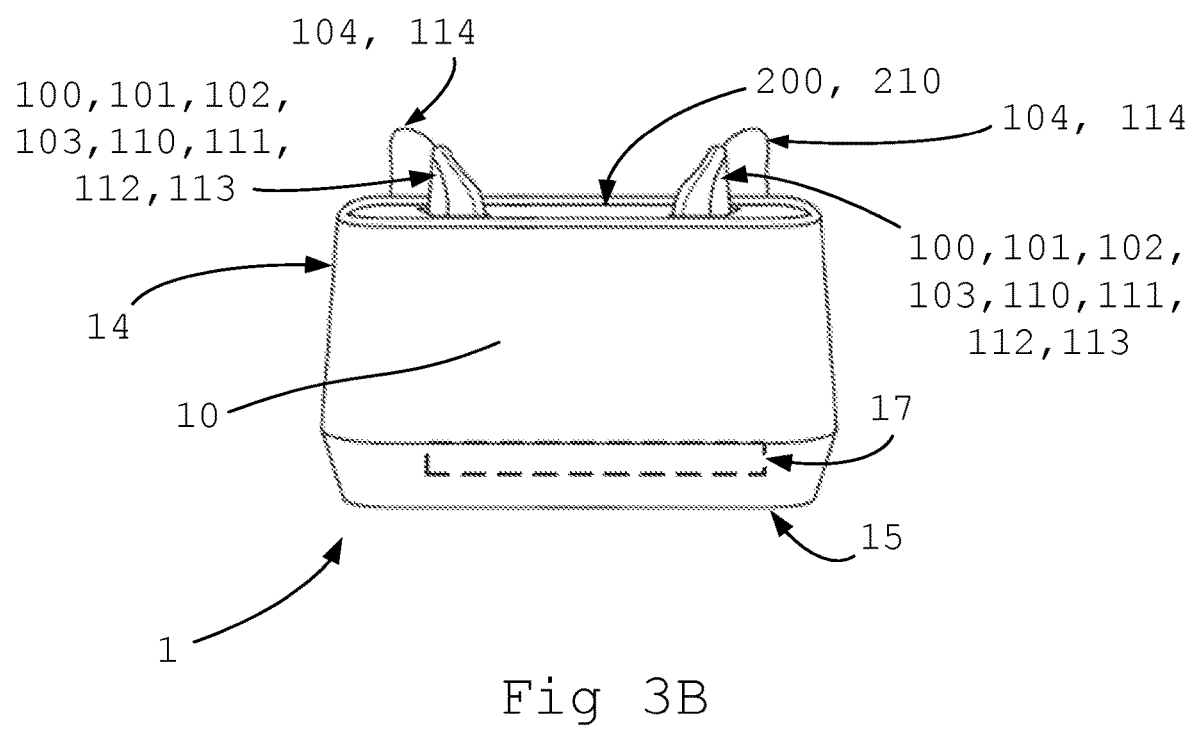
FIG. 3B shows a side view of the hearing device charger of FIGS. 1B and 2B in a direction from the left of FIG. 1B according to an embodiment of the present disclosure.

FIG. 1C shows the charging kit or assembly 1 when being assembled or at disassembly (vertical double arrows visualize the directions of assembly and disassembly and the directions of insertion and removal of the model specific insert(s) 200, 210). The components making up the base charger 10, such as the frame 16, 16B, the control unit 17 and the bottom housing 15 are in some embodiments, e.g. in FIG. 1C, detachably connected by means of attachments 13A, e.g. screws, but could also be connected via snap fit locking 13 or the like as shown in FIG. 8B. In FIG. 1C, the frame 16 comprises walls 16B that define at least one cavity 16A for receiving at least one model specific cavity 201, 211 of at least one model specific insert 200, 210. In FIG. 1C, the frame 16 is a stand or support for holding/attaching the adjustable support(s) 20 at one or more attachment points 21 and for enabling guiding and controlling the adjustability and movement of the adjustable support via one or more guides 27.

In some embodiments, the base charger 10 comprises one or more cavities 12 configured to mate with or receive the first model specific insert 200 and/or the second model specific insert 210, see FIGS. 1C and 6A to 14. The frame cavity(ies) 16A are arranged inside or within these one or more cavities 12 of the base charger after assembly, see e.g. FIGS. 1C (after the top housing 14 is thread or placed over the frame 16 from above), 6A, 6B, 7B, 8A to 8C, 10A, 11A, 11B and 12. Each model specific insert 200, 210 in all embodiments of the present disclosure is configured to be held in place in the base charger 10 after insertion therein to form the charging kit and hearing device charger 1 by means of at least one attachment 13, see FIGS. 1C and 8B. The attachment 13 could be a snap fit locking or screw or adhesive bonding or similar, see FIGS. 1C and 8B. In FIG. 1C, the attachment 13 is shown as a snap fit lock comprising one or more hook(s) 13 protruding from the first or second model specific insert 200, 210 and corresponding one or more catch(es) 13 in the top housing 14 of the base charger 10 configured for receiving and/or holding and/or retaining the hook(s) 13. The model specific insert(s) 200, 210 is/are in some embodiments detachably attached to the frame 16, 16B and/or the top housing 14 and/or the bottom housing 15 of the base charger 10.

Each model specific insert 200, 210 comprises at least one model specific cavity 201, 211 configured to mate with the first or second model specific hearing device 100, 110, respectively, see FIGS. 1A to 5B, 6B, 6C, 7A to 7C, 8A to 8B, 10B, 11B, and 13A to 13B. This mating is preferably provided by molding the model specific insert(s) 200, 210 and the model specific cavity(ies) 201, 211 according to the associated hearing device(s) 100, 110. A tolerance may be added to the model specific cavity 201, 211 in order to provide a loose fit of the model specific hearing aid(s) 100, 110 in the model specific cavity. In some embodiments, each model specific insert 200, 210 comprises two model specific cavities 201, 211 of which each model specific cavity 201, 211 is configured to mate with an associated one of the first model specific hearing devices 100 or to mate with an associated one of the second model specific hearing devices 110. Commonly, each model specific cavity 201, 211 is configured to receive only one hearing device 100, 110. In some embodiments (not shown), each model specific cavity 201, 211 is configured to receive two or more hearing devices, providing one common model specific cavity 201, 211, e.g. as a twin cavity having two open and adjoining halves or spaces, one half space for each hearing device. In some embodiments, each model specific insert 200, 210 comprises two model specific cavities 201, 211 that pairwise is configured to mate with an associated pair of first model specific hearing devices 100 or to mate with an associated pair of the second model specific hearing devices 110, see at least FIGS. 1A to 5B.

In some embodiments, at least one of the first model specific hearing devices 100 and/or at least one of the second model specific hearing devices 110 and/or each of the hearing devices 100, 110 is configured for wireless charging, e.g. by means of inductive coupling, capacitive coupling, magnetic coupling, radio frequencies, light waves and/or sound waves, etc. In some embodiments, one or both or more or all of the first and the second model specific hearing devices 100, 110 is/are inductively chargeable. The transmitter charging element(s) 11 may in this disclosure be one or more transmitter coils and the receiver charging element(s) 101, 111 may be one or more receiver coils, such as one or more inductive transmitter coils and one or more inductive receiver coils.

Figure 4A:
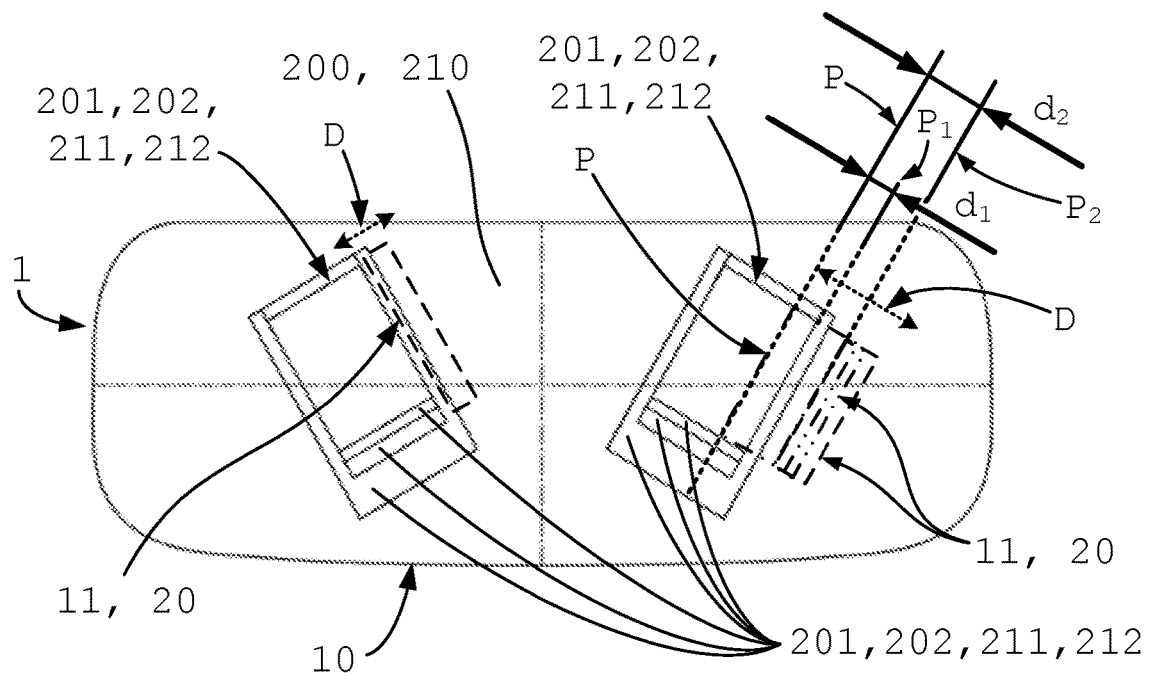
FIG. 4A shows a hearing device charger in a top plane view according to an embodiment of the present disclosure.
Figure 4B:
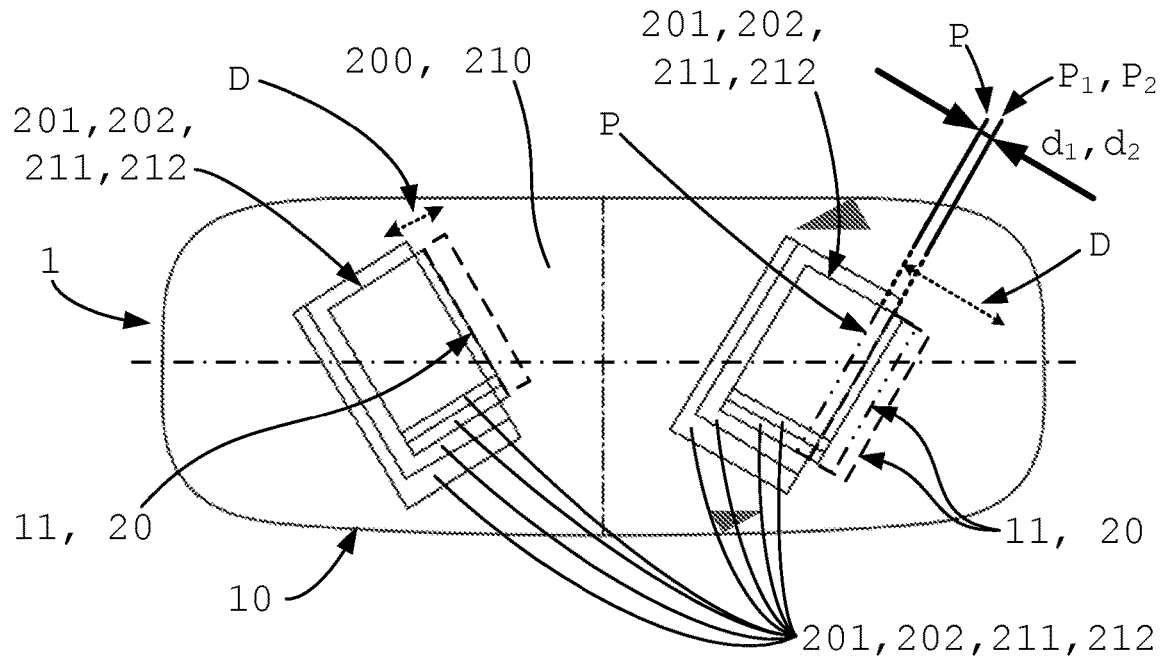
FIG. 4B shows a hearing device charger in a top plane view according to an embodiment of the present disclosure.

In some embodiments, see FIGS. 1B, 2B, 3B, 4A and 4B, the hearing device charger 1 is configured to comprise two model specific hearing devices 100, 110 inserted into the model specific insert 200, 210. The transmitter charging element(s) 11 to the right in FIGS. 4A and 4B is arranged to be positioned at a start or base position P in the cavity/-ies 12 of the base charger 10 before the first model specific insert 200 or the (different) second model specific insert 210 is placed in the base charger 10. This start position P is shown in FIGS. 4A, 4B, 5A, 5B, 6A, 7A, 8C, 8D, 9A, 9B, 10A, 11A, 12, 13A, 13C and 14 before insertion of any model specific insert 200, 210 in the base charger 10. The same goes for the transmitter charging element(s) 11 to the left in FIGS. 4A and 4B but for simplicity only the change of positions of each transmitter charging element and direction D of displacement are visualized with single and double arrows and dotted and dashed lines in more detail by means of the right transmitter charging element(s) 11 of FIGS. 4A and 4B, and in some detail for any of the transmitter charging element(s) 11 in FIGS. 1C, 7A and 13A to demonstrate the principle and functionality of the adjustable support(s) 20. The transmitter charging element(s) 11 is/are configured to be displaced to a first position $P_1$ by the first model specific insert 200. This enables the transmitter charging element(s) 11 to act with a bias/urging force towards the first model specific insert 200 when the first model specific insert is placed in the base charger 10. The first position $P_1$ is different from the start or base position P. This first position $P_1$ is shown in FIGS. 4A, 4B, 6B, 6C, 7A to 7C, 8A, 8B, 10B, 11B, 13B and 14. FIG. 4A further shows how a first distance $d_1$ from the start position P to the first position $P_1$ may be shorter than a second distance $d_2$ from the start position P to the second position $P_2$. However, in FIG. 4A, the first distance $d_1$ from the start position P to the first position $P_1$ could be longer than the second distance $d_2$ from the start position P to the second position $P_2$, hence, these distances $d_1$ and $d_2$ depend on the model specific insert(s) 200, 210. In some embodiments, these distances are more than two distances, e.g. a third or fourth distance in same way as the positions could be more than two positions if more than two different model specific inserts 200, 210 were configured to be placed in the base charger 10 as the base charger 10 is adapted to receive more than two such different model specific inserts, one model specific insert at a time. FIG. 4A further shows how a symmetrical placement of two cavities 201, 211 in a model specific insert 200, 210 may be provided by means of the disclosed embodiments independent on which model specific insert is placed in the base charger 10, e.g. independent on whether the first 200 or second model specific insert 210 or another model specific insert is placed in the base charger. This compared to FIG. 4B where positioning of the transmitter charging element(s) 11 and receiver charging element(s) 101, 111 in the base charger cavity is the same for all model specific insert. In FIGS. 4A and 4B, the distances $d_1$ and $d_2$ and sizes of the transmitter charging element(s) are not to scale to be able to visualize the movements between different positions, such as from the start position P for a first model specific insert 200 urging the transmitter charging element(s) 11 away from the first model specific insert to a first position $P_1$ at a first distance $d_1$ being smaller than when a second model specific insert 210 is inserted into the base charger 10 and urging the transmitter charging element(s) 11 to a second position $P_2$ at a second distance $d_2$. In embodiments of FIGS. 13A to 13C, the model specific insert(s) 200, 210 when inserted into base charger 10 along the direction of the arrow pointing downwards, a lever 25 is pushed down urging the transmitter charging element(s) 11 towards the first model specific insert 200 to a first position $P_1$ at a first distance $d_1$ or towards the second model specific insert 210 to a second position $P_2$ at a second distance d 2.

In some embodiments, the transmitter charging element(s) 11 is/are configured to be displaced to the first position $P_1$ to align with the first receiver charging element(s) 101 of the first model specific hearing device 100 when the first model specific hearing device is placed in the first model specific insert 200 in the base charger 10. This enables the transmitter charging element(s) 11 to act with a bias or urging force towards the first model specific insert 200 and the first receiver charging element(s) 101 of the first model specific hearing device 100. In some embodiments, the transmitter charging element(s) 11 is/are arranged to be positioned at the start position P in the cavity/-ies 12 of the base charger 10 before the second model specific insert 210 is placed in the base charger. The transmitter charging element(s) 11 is/are configured to be displaced to a first position $P_1$ or a second position $P_2$ by the second model specific insert 210. This enables the transmitter charging element(s) 11 to act with a bias/urging force towards the second model specific insert 210 when the second model specific insert is placed in the base charger 10. The first or second position $P_1$, $P_2$ is different from the start position P. This first or second position $P_1$, $P_2$ is shown in FIGS. 4A, 4B, 5A, 5B, 6B, 6C, 7A to 7C, 8A, 8B, 10B, 11B, 13A to 13C and 14.

In some embodiments, the transmitter charging element(s) 11 is/are configured to be displaced to the second position $P_2$ to align with the second receiver charging element 111 of the second model specific hearing device 110 when the second model specific hearing device is placed in the second model specific insert 210 in the base charger 10. This enables the transmitter charging element(s) 11 to act with a bias or urging force towards the second model specific insert 210 and the second receiver charging element 111 of the second model specific hearing device 110. The first or second position P$_1$, P$_2$ is shown in FIGS. 4A, 4B, 5A, 5B, 6B, 6C, 7A to 7C, 8A, 8B, 10B, 11B, 13A to 13C and 14. In some embodiments, the first distance d$_1$ between the start position(s) P and the first position(s) P$_1$ is shorter, equal to or longer than the second distance d$_2$ between the start position(s) P and the second position(s) P$_2$. The positions P, P$_1$ and P$_2$ are shown in FIGS. 4A, 4B, 6A to 6C, 7A to 7C, 8A to 9B, 10A to 10B, 11A to 11B, 12, 13A to 13C and 14. In some embodiments, another model specific insert, e.g. a third or fourth one displaces the transmitter charging element(s) 11 to the first position P$_1$ or the second position P$_1$ or to another position if placed in the base charger 10, i.e. these positions are in some embodiments different for each model specific insert. The above enables maintaining the symmetry of the cavities 201, 211 in the base charger 10 even though differently shaped model specific inserts are placed therein.

In some embodiments, the adjustable support(s) 20 of the base charger 10 comprises one or more elastic elements 22 to make the transmitter charging element(s) 11 of the base charger movable between different positions P, P$_1$, P$_2$ in the base charger. This enables the transmitter charging element(s) 11 to act with a bias/urging force towards or against or into contact with the first model specific insert 200 or the second model specific insert 210 when the first or second model specific insert is placed in the base charger 10. In some embodiments, the elastic element(s) 22 of the adjustable support(s) 20 make the transmitter charging element(s) 11 of the base charger 10 movable between different positions P, P$_1$, P$_2$ in the base charger when the first or second model specific hearing device 100, 110 is placed in the first or second model specific insert 200, 210. This enables the transmitter charging element(s) 11 to act with a bias or urging force towards or against or into contact with the first receiver charging element 101 of the first model specific hearing device 100 when the first model specific hearing device is placed in the first model specific insert 200 in the base charger 10, and also to act with a bias/urging force towards or against or into contact with the second receiver charging element 111 of the second model specific hearing device 110 when the second model specific hearing device is placed in the second model specific insert 210 in the base charger.

In some embodiments, see e.g. FIGS. 6A to 6C, 7A to 7C, and 8A to 13C, the adjustable support 20 comprises an elongated body with a first free end 20A and a second end 20B opposite the first free end. Here, the transmitter charging element(s) 11 is/are arranged on the first free end 20A of the adjustable support 20. The support plate 11A may be arranged between the transmitter charging element(s) 11 and the first free end 20A. The transmitter charging element(s) 11 may be attached to the first free end 20A via the support plate 11A. In some embodiments, see e.g. FIGS. 6A to 6C, 7C, 8A to 9B, 10A, 10B, 11A, 11B, 12, and 13A to 13C, the second end 20B of the adjustable support 20 is attached to a guide 27 or attachment point 21 in the base charger 10. Here, the first free end 20A of the adjustable support 20 is arranged movable and/or displaceable in the cavity/-ies 12 of the base charger 10. In some embodiments, the elongated body of the adjustable support 20 comprises or is the elastic or compressible element 22, 23.

In some embodiments, see e.g. FIGS. 6A to 12, each adjustable support 20 comprises an elastic element 22 arranged at least partly between the first free end 20A and the second end 20B to exert a push force urging the first free end 20A of the adjustable support and/or the transmitter charging element(s) 11 inside the base charger 10 in a direction being substantially in parallel with or in parallel with or inclined or substantially perpendicular or perpendicular to the direction of insertion of the first 200 and/or the second model specific insert(s) 210. These directions may be guided by at least one guide 27 in which the elongated body of the adjustable support 20 is moved by being displaced or slid by the elastic element 22 urging or biasing the elongated body, see FIGS. 1C, 6A to 6C, 7A to 7C, and 10A, 10B.

Figure 6A:
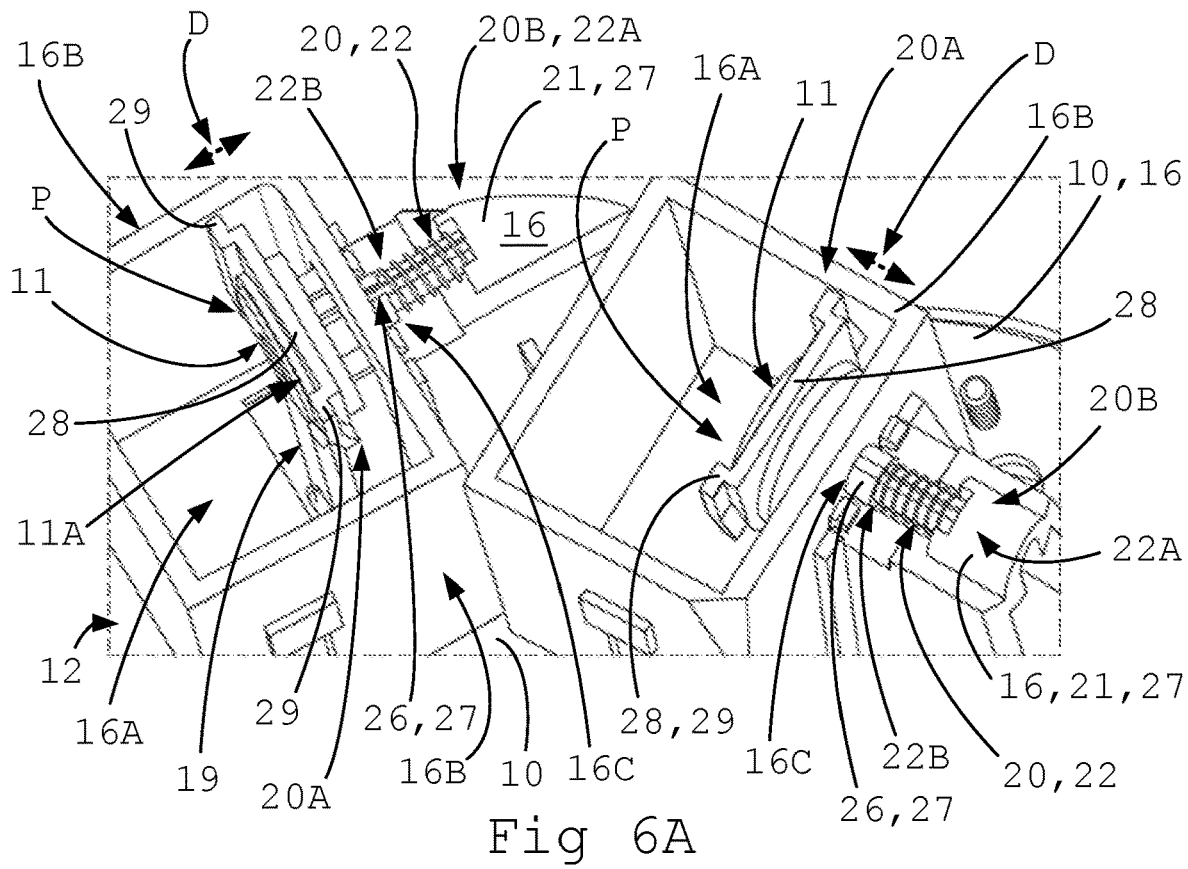
FIG. 6A shows a perspective top view (towards the top/upper surface/side) of a part of a base charger of a hearing device charger (without any model specific insert) according to an embodiment of the present disclosure.
Figure 6B:
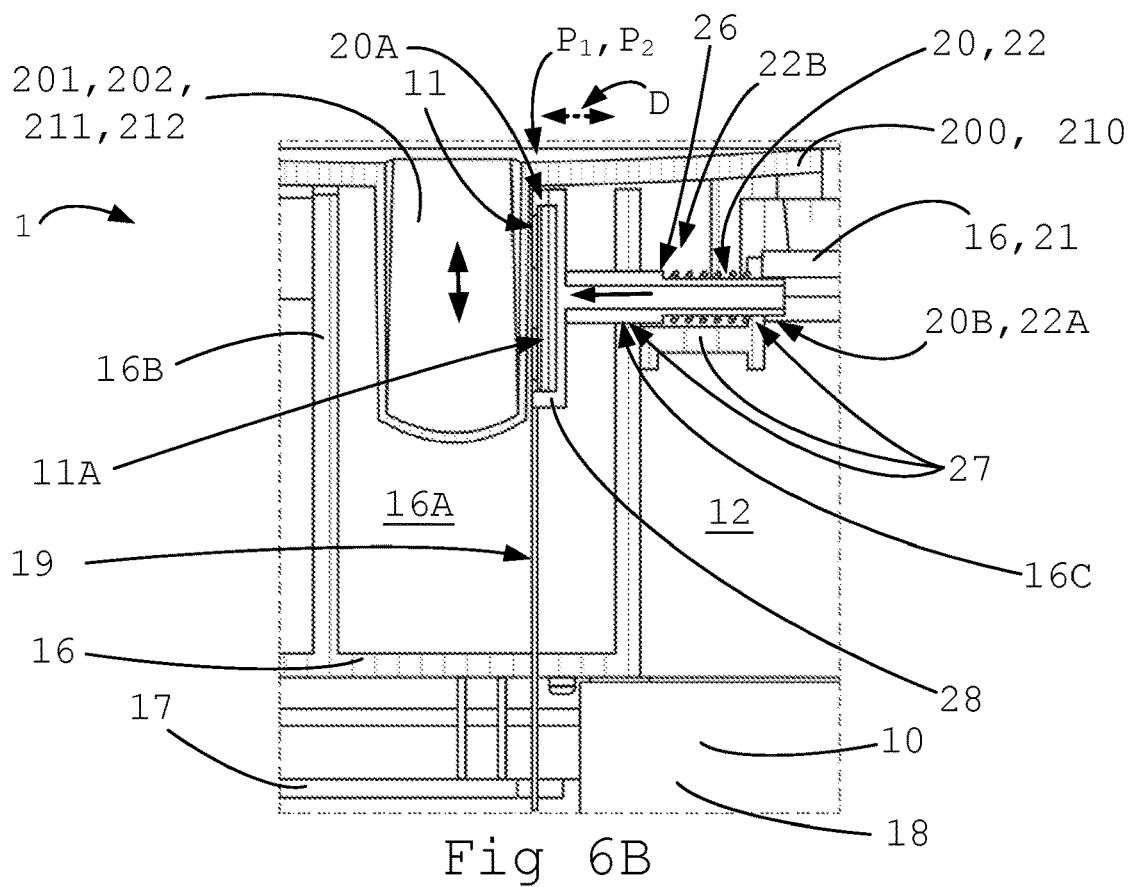
FIG. 6B shows a side plane view in cross-section of a part of a hearing device charger (with a model specific insert) according to an embodiment of the present disclosure.
Figure 6C:
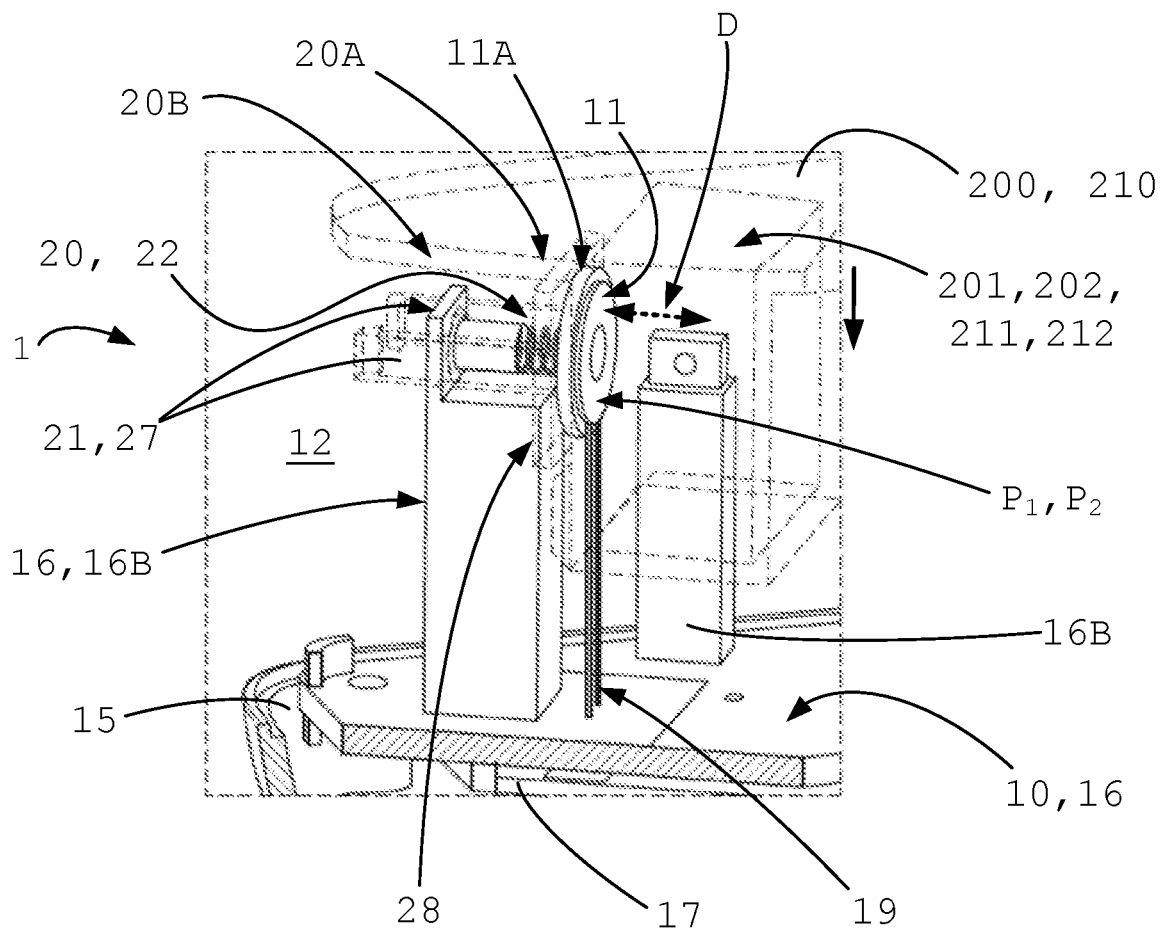
FIG. 6C shows a side view in perspective in cross-section of a part of a hearing device charger (with a model specific insert) according to an embodiment of the present disclosure.

In some embodiments, see e.g. FIGS. 6A to 6C, the elastic element 22 is located between the first free end 20A and the second end 20B of the adjustable support 20, i.e. located between a first attachment point 21 at the second end 20B in the form of a wall of the inner frame 16 of the base charger 10 and a second attachment point at the first free end 20A in the form of a shoulder or collar 26 on the elongated body of the adjustable support, see FIG. 6B. Here, the elastic element 22 of the adjustable support 20 is a helical spring arranged at least partly restrained between the shoulder 26 of the first free end 20A and the attachment point 21 of the second end 20B to be pre-tensioned to exert the bias or urging or pushing force towards the model specific insert(s) 200, 210, which push force is directed to the left of FIG. 6B, similar to the horizontal arrow in the elongated body of the adjustable support 20. In some embodiments, e.g. in FIGS. 6A and 6B, the helical spring 22 has one or first end 22A supported at the first attachment point 21 and guided by a first guide 27 at this end to the right in the figs. and has another or second end 22B to the left in these figs., which second end 22B is supported and guided by the second attachment point being the shoulder 26 and a second guide 27. The guides 27 provides control and stable movement for the elongated body and the helical spring 22 of the adjustable support 20 when being displaced back and forth in the urging direction D, i.e. away from or towards the model specific insert(s) 200, 210 when inserted into or removed from the base charger 10. In some embodiments, at least one or each of the first and the second ends 22A, 22B of the helical spring 22 is/are attached to the first attachment point 21 and/or the second attachment point being the shoulder 26, this is of advantage to not have to handle a loose spring if assembled together with the elongated body of the adjustable support but may worsen the functionality and life span of the spring 22 due to higher incurred strain at its end(s).

In some embodiments, in FIGS. 6A to 6C and 8A to 13C, the transmitter charging element(s) 11 is/are supported or connected or attached to a holder 28. The holder 28 is in some embodiments securely attached to or integrated in the first free end 20A of the adjustable support 20 as in FIGS. 6A to 6C, and 10A to 12 or an integrated part of the free end 20A as in FIGS. 8A to 9B and 13A to 13C.

This holder 28 has at least two functions, one being a support for the transmitter charging element(s) 11 and one being a protection against wear from the model specific insert(s) 200, 210 when inserted or removed from the base charger 10. This wear protection of the holder 28 for the transmitter charging element(s) 11 is achieved in some embodiments by providing the holder with an outer protective frame or flange or edge 29 that could be straight or conical for enabling a loose fit at the beginning of the insertion of the model specific insert(s) 200, 210 and tighter fit the further down the model specific insert(s) are moved into the base charger 10 and while urging the transmitter charging element(s) away or towards itself/themselves. In some embodiments, the protective flange or edge 29 extends around the whole circumference of the transmitter charging element(s) 11 or at least partly around the circumference of the transmitter charging element(s) 11. The protective flange or edge 29 may extend around the upper circumference of the transmitter charging element(s) 11 closer to the upper housing 14 of the base charger as seen e.g. in FIGS. 9A and 9B or extend at least partly around the circumference of the transmitter charging element(s) 11 with a shape similar to an upright U or horse shoe with its orifice or mouth directed upwards as seen e.g. in FIGS. 8B, 8C, 8D, 10A, 11A, and 12 or an upside down U or horse shoe as seen e.g. in FIG. 9A. In some embodiments, e.g. in FIGS. 6A and 10A, the protective flange or edge 29 extends around the circumference of the transmitter charging element(s) 11 forming sides extending in substantially the same direction as the direction of insertion for the model specific insert(s) 200, 210. In some embodiments, e.g. in FIG. 6A, the protective flange or edge 29 extends around the circumference of the transmitter charging element(s) 11 forming sides extending in substantially the same direction as the direction of insertion for the model specific insert(s) 200, 210, which sides 29 extends in one direction substantially vertical closer to the upper housing 14 of the base charger 10 and transcends into another direction at the end closer to the bottom housing 15 of the base charger in an inclined direction towards the first free end 20A of the adjustable support 20.

In some embodiments, see FIGS. 6A and 6B, the spring 22 is configured to extend along the elongated body of the adjustable support 20 and to enclose or encompass or surround or cover at least a part of the outer surface of the elongated body of the adjustable support. The elongated body of the adjustable support 20 may be shaped like a cylindrical pin or be profiled with another elongated shape via extrusion. The cylindrical pin of the adjustable support 20 may be a solid or hollow cylindrical pin. The cylindrical pin of the adjustable support 20 is guided in the guide 27 of FIGS. 6A and 6B by sliding back and forth to the right or left in these figs. according to the horizontal double arrow visualizing the urging or pushing direction D when the model specific insert(s) 200, 210 is/are inserted into or removed from the base charger 10 as visualized by the vertical double arrow inside the model specific cavity/-ies 201, 211. In some embodiments, see FIG. 6C, the spring 22 is configured to extend along the elongated body of the adjustable support 20 but at least partly inside a channel or groove of the elongated body of the adjustable support.

In some embodiments, see e.g. FIGS. 6A, 6B, 8A to 8C, and 10A to 12, the first free end 20A of the adjustable support 20 and/or the transmitter charging element(s) 11 are/is arranged at least partly in one or more insert cavities 16A of the frame 16 of the base charger 10. Each insert cavity 16A is defined by one or more insert guides 16B, such as one or more walls 16B extending from the frame 16 of the base charger 10 or one or more surfaces 16B of the frame 16 of the base charger 10. The one or more insert guides 16B may fully or partly enclose the respective model specific cavity 201, 211 as long as an orifice is provided for receiving the model specific insert(s) 200, 210 when introduced into the base charger 10. The one or more insert guides 16B of the base charger 10 may facilitate correct placement, i.e. guidance, of placement and alignment of the model specific insert(s) 200, 210 in the base charger 10.

In some embodiments, the base charger 10 comprises one or more insert receiving cavities 16A in which the model specific inserts 200, 210 with the model specific insert cavities 201, 211 are received.

Figure 5A:
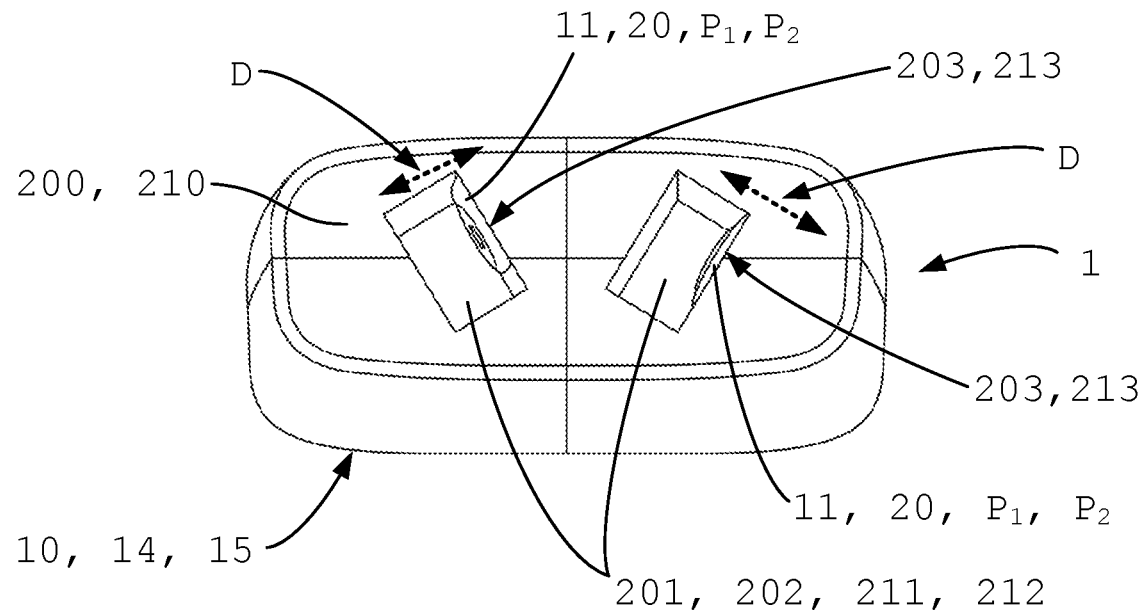
FIG. 5A shows a hearing device charger without hearing devices in a perspective top view (seen towards the top/upper surface/side of the hearing device charger) with exposed transmitter receiver elements according to an embodiment of the present disclosure.
Figure 5B:
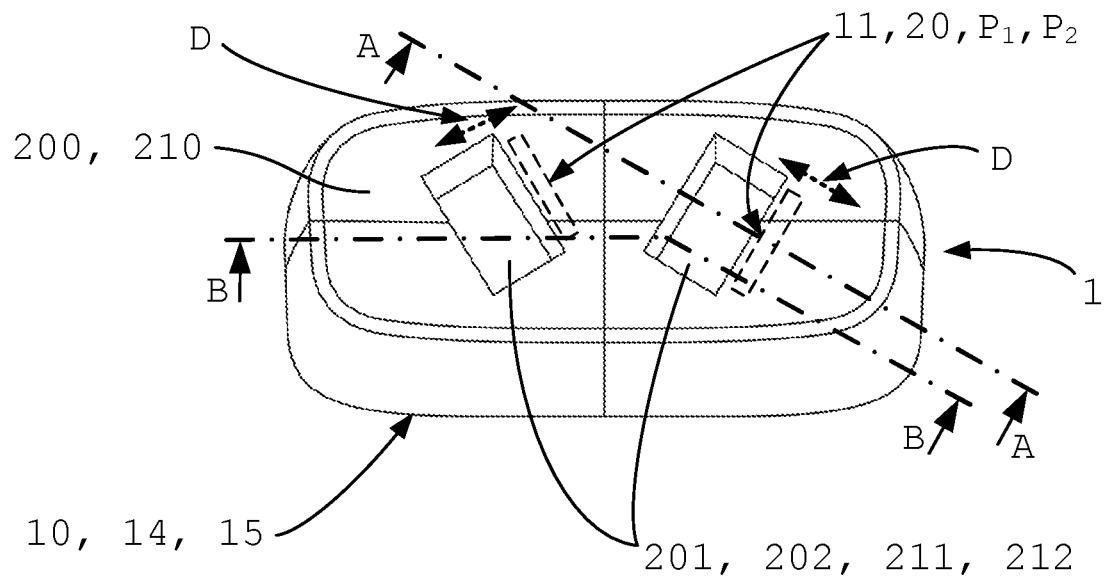
FIG. 5B shows a hearing device charger without hearing devices in a perspective top view (seen towards the top/upper surface/side of the hearing device charger) with no transmitter receiver elements exposed according to an embodiment of the present disclosure.
Figure 8C:
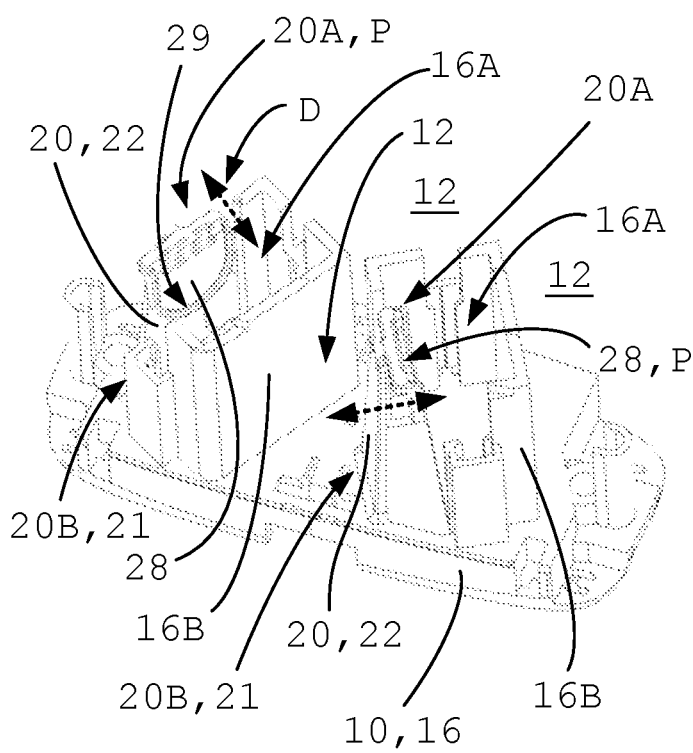
FIGS. 8C and 8D show perspective views of parts of the base charger of the hearing device charger in FIGS. 8A and 8B (without any model specific insert) according to an embodiment of the present disclosure.
Figure 8D:
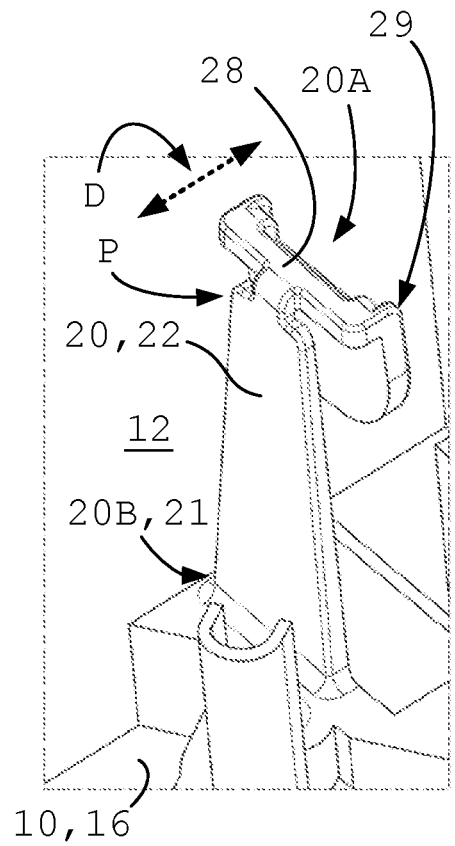
Figure 9A:
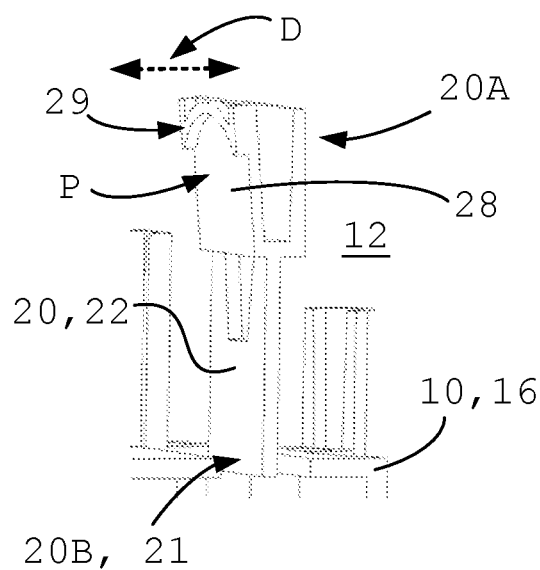
FIG. 9A shows a perspective side view of a part in a base charger of a hearing device charger (without any model specific insert) according to an embodiment of the present disclosure.
Figure 9B:
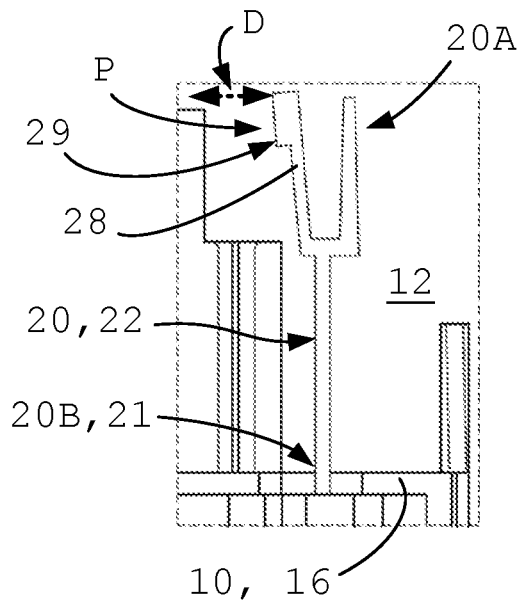
FIG. 9B shows a side view of a cross-section of the part in the base charger in a direction from the right to the left in FIG. 9A according to an embodiment of the present disclosure.
Figure 10A:
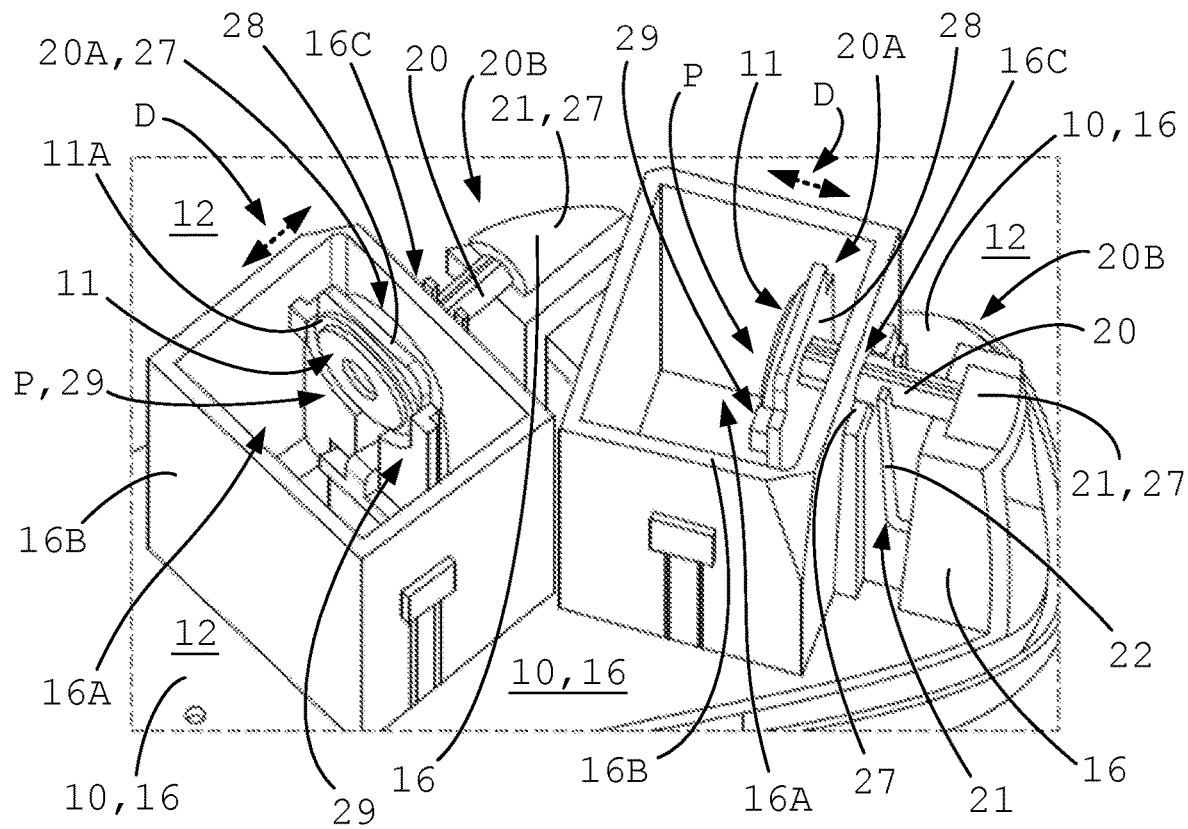
FIG. 10A shows a perspective top view (seen towards the top/upper surface/side) of a part of a base charger of a hearing device charger (without model specific inserts) according to an embodiment of the present disclosure.
Figure 10B:
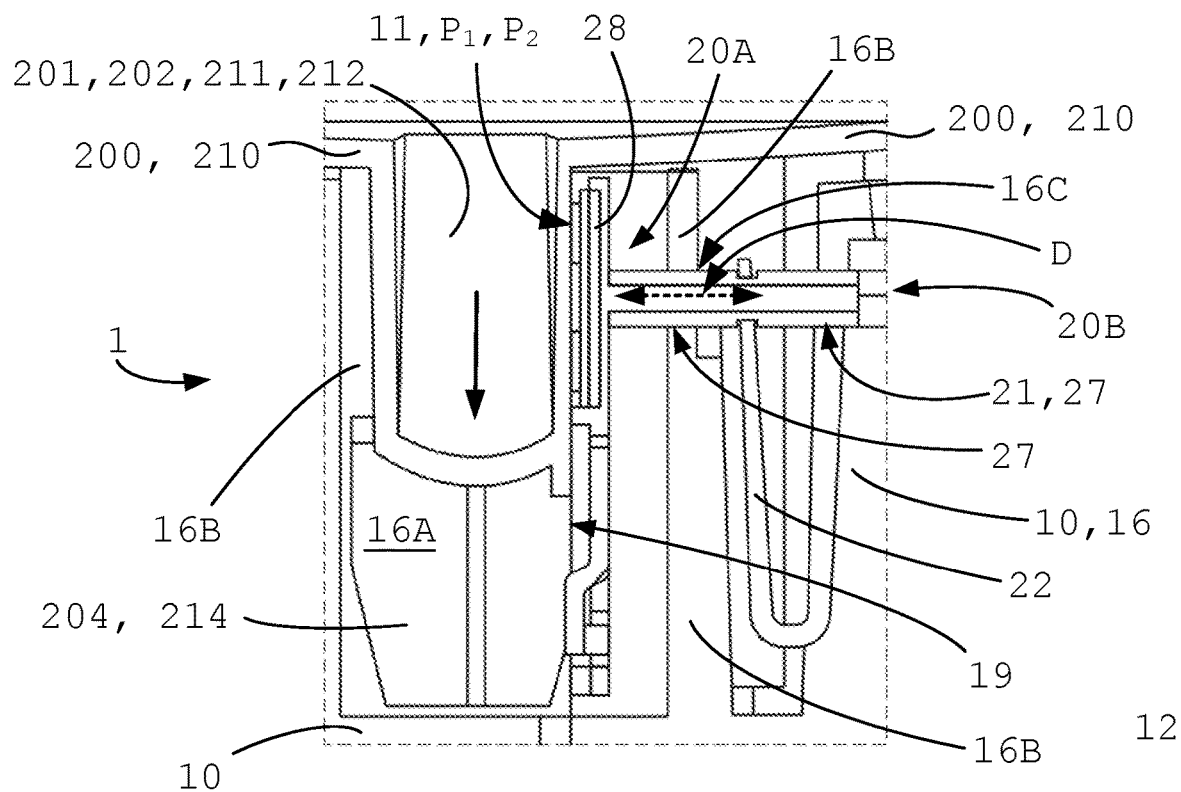
FIG. 10B shows a side plane view in cross-section of a part of a hearing device charger (with a model specific insert) according to an embodiment of the present disclosure.

In some embodiments, see FIGS. 5A, 8A and 8B, the first free end 20A of the adjustable support 20 is arranged at least partly in the model specific insert cavities 201, 211 and the insert receiving cavities 16A of the base charger. In some embodiments, see FIGS. 5A, 8A and 8B, the transmitter charging element(s) 11 is/are arranged at least partly in the model specific insert cavities 201, 211 and the insert receiving cavities 16A of the base charger. In some embodiments, see FIGS. 5A, 8A and 8B, the first free end 20A of the adjustable support 20 and the transmitter charging element(s) 11 are arranged at least partly in the model specific insert cavities 201, 211 and the insert receiving cavities 16A of the base charger. In some embodiments, see FIGS. 5A, 6A, 6B, 8A to 8C, 10A, 10B, 11A, 11B and 12, the first free end 20A of the adjustable support 20 is arranged at least partly or fully in the insert receiving cavities 16A of the base charger 10. In some embodiments, see FIGS. 5A, 6A, 6B, 8A to 8C, 10A, 10B, 11A, 11B and 12, the transmitter charging element(s) 11 is/are arranged at least partly or fully in the insert receiving cavities 16A of the base charger 10. In some embodiments, see FIGS. 5A, 6A, 6B, 8A to 8C, 10A, 10B, 11A, 11B and 12, the first free end 20A of the adjustable support 20 and the transmitter charging element(s) 11 are arranged at least partly or fully in the insert receiving cavities 16A of the base charger 10.

In some embodiments, see e.g. FIGS. 1A, 2A, 5B, 6B, 7A to 7C, 10B, 11B, 13A, and 13B, the first free end 20A of the adjustable support 20 and/or the transmitter charging element(s) 11 are/is arranged fully outside the model specific insert cavities 201, 211. In some embodiments, see e.g. FIGS. 5B, 6B, 7A to 7C, 10B, 11B, 13A, and 13B, the first free end 20A of the adjustable support 20 and/or the transmitter charging element(s) 11 are/is arranged at least partly in or fully outside the model specific insert cavities 201, 211 and the insert receiving cavities 16A of the base charger 10.

In some embodiments, see e.g. FIGS. 5A, 8A and 8B, the model specific cavity/-ies 201, 211 of the first or second model specific insert(s) 200, 210 each is defined by at least one insert cavity wall 202, 212 of the model specific insert and wherein each model specific cavity 201, 211 comprises one or more through holes 203, 213 through the insert cavity wall(s) 202, 212. Hence, the first free end 20A of the adjustable support 20 and/or the transmitter charging element(s) 11 are/is arranged at least partly in one or more of the through holes 203, 213 when any of the first or second model specific insert(s) 200, 210 is placed in the base charger 10.

In some embodiments, see e.g. FIG. 1C, the first and/or second model specific inserts 200, 210 may comprise one or more guide elements 204, 214 configured to support correct/controlled insertion of the first or second model specific insert 200, 210 into the base charger 10. The guide elements 204, 214 may protrude from or be attached to or arranged on an bottom outer surface or bottom cavity wall 202, 212 and/or one or more side outer surface(s) or side cavity wall(s) 202, 212 of the one or more cavity/-ies 201, 211 of the model specific insert(s) 200, 210. Outer surfaces of the cavity/-ies 201, 211 are the surfaces not facing and/or not being in contact with the model specific hearing aid(s) 100, 110 when inserted. Inner surfaces of the cavity/-ies 201, 211 are the surfaces facing and/or being in contact with the model specific hearing aid 100, 110 when inserted.

Figure 11A:
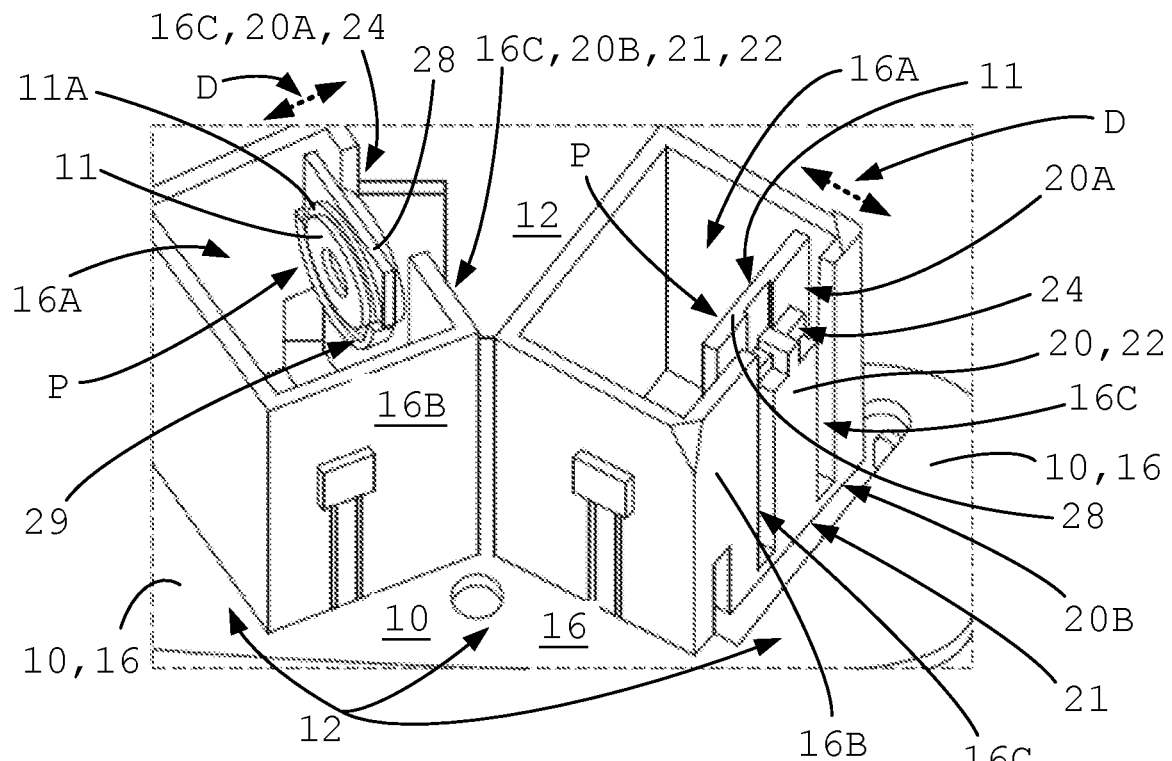
FIG. 11A shows a perspective top view (seen towards the top/upper surface/side) of a part of a base charger of a hearing device charger (without model specific inserts) according to an embodiment of the present disclosure.
Figure 11B:
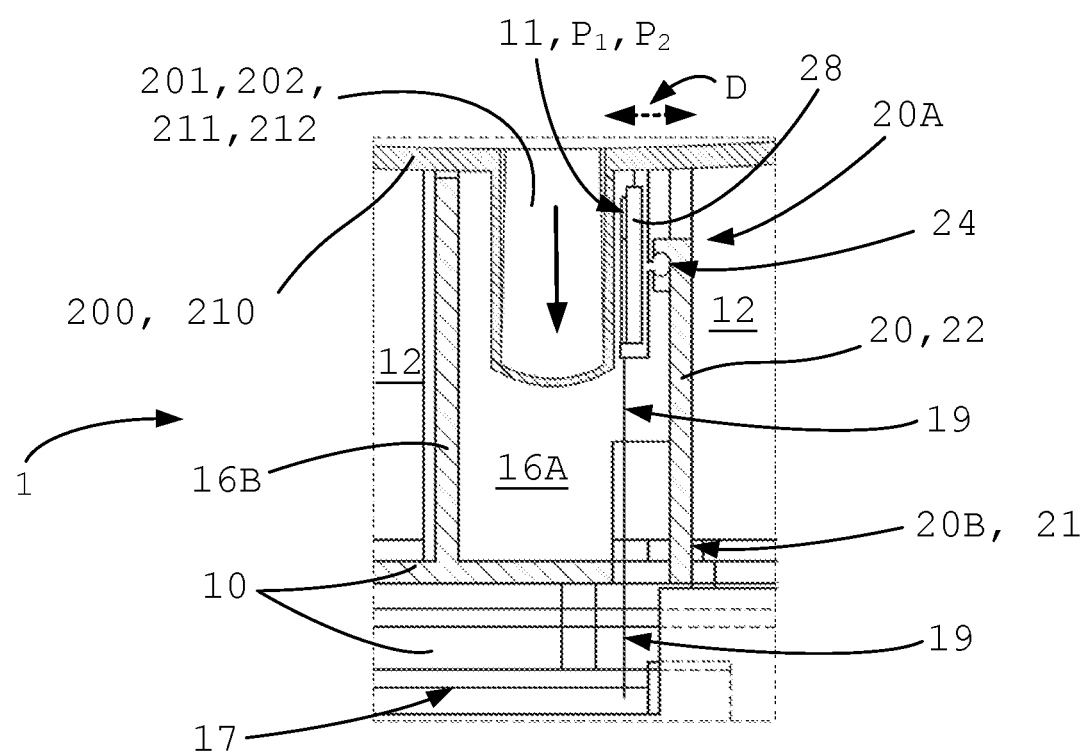
FIG. 11B shows a side plane view in cross-section of a part of a hearing device charger (with a model specific insert) according to an embodiment of the present disclosure.
Figure 12:
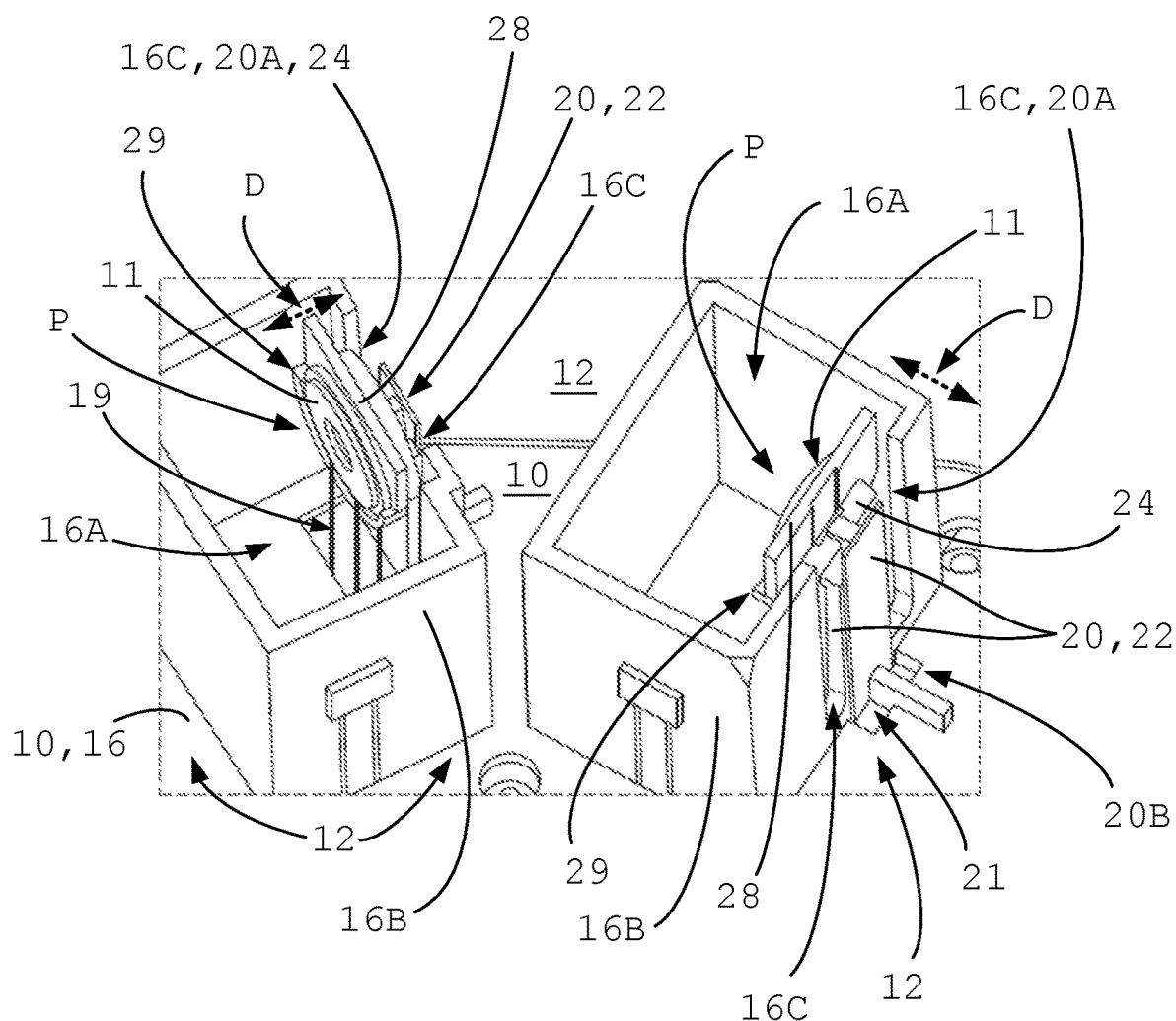
FIG. 12 shows a perspective top view (seen towards the top/upper surface/side) of a part of a base charger of a hearing device charger (without model specific inserts) according to an embodiment of the present disclosure.

In some embodiments, see e.g. FIGS. 6A, 6B, 10A, and 10B, the insert cavity(ies) 16A comprise(s) one or more insert guides or one or more insert guide walls 16B, wherein at least one of the insert guides or insert guide walls 16B comprises one or more through holes 16C in the insert guide or insert guide wall(s) 16B, which through hole(s) 16C is/are closed or fully surrounded by the insert guide(s) or insert guide wall(s) 16B over the whole circumference of the hole 16C, while in some embodiments, see e.g. FIGS. 11A, and 12, the through hole(s) 16C is/are only partly closed or surrounded by the insert guide or insert guide wall(s) 16B, i.e. holes are not closed, e.g. in FIGS. 11A and 12, the through holes 16C are elongated through holes or slits through the thickness of the insert guide or insert guide walls 16B extending all the way up to the edge or side of each insert cavity 16A and the one or more insert guides or insert guide walls 16B making the through holes 16C into recesses, whereby, here, the adjustable support 20 is a part of the insert guide(s) or insert guide wall(s) 16B. In some embodiments, see e.g. FIGS. 6A, 6B, 10A, and 10B, the elongated body of the adjustable support 20 shaped like a cylindrical pin or profiled with another elongated shape via extrusion may be arranged in the through hole(s) 16C. The elongated body of the adjustable support 20 shaped like a cylindrical pin may be configured to slide back and forth in the through hole 16C in the direction D when the first or second model specific insert 200, 210 is inserted or removed from the base charger 10.

In some embodiments, see e.g. FIGS. 6B, 6C, 7A to 7C, 10B, and 13A to 13C, the first free end(s) 20A of the adjustable support(s) 20 and/or the transmitter charging element(s) 11 are/is arranged fully outside one or more model specific insert cavities 201, 211 of the first or second model specific insert 200, 210.

In some embodiments, see e.g. FIGS. 7A to 7C and 8A to 12, the elastic element 22 comprises at least one elastic arm similar to a leaf spring or the elastic element 22 is made up of at least one elastic arm or leaf spring. In some embodiments, see e.g. FIG. 7A, the adjustable support 20 comprises the elastic arm(s) or leaf spring(s) 22 and the compressible element 23, which together enable the adaptable positioning of the transmitter charging element(s) 11 being pressed against the compressible element 23 when the model specific insert(s) 200, 210 are placed in the base charger 10 and the elastic arm(s) or leaf spring(s) 22 enable a flexibility in the direction perpendicular to the direction of insertion (shown by the solid arrow) for the model specific insert(s) 200, 210 to provide an adaptable aligning of the transmitter charging element(s) 11 with the model specific insert(s) 200, 210 that are differently sized and/or shaped etc., see this visualized in dotted lines in FIG. 7A to show another model specific insert being displaced and inserted at another position, as positions P and $P_1$, $P_2$ depending on the model specific insert(s) 200, 210, the same positioning is applicable to FIGS. 7B and 7C.

Figure 7A:
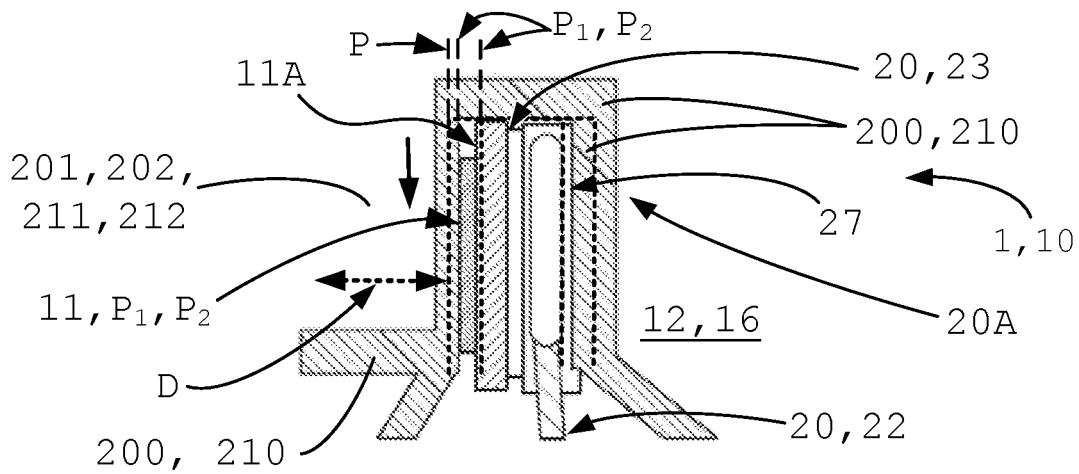
FIG. 7A shows a side plane view of a cross-section of a part of a hearing device charger (with a model specific insert) according to an embodiment of the present disclosure.
Figure 7B:
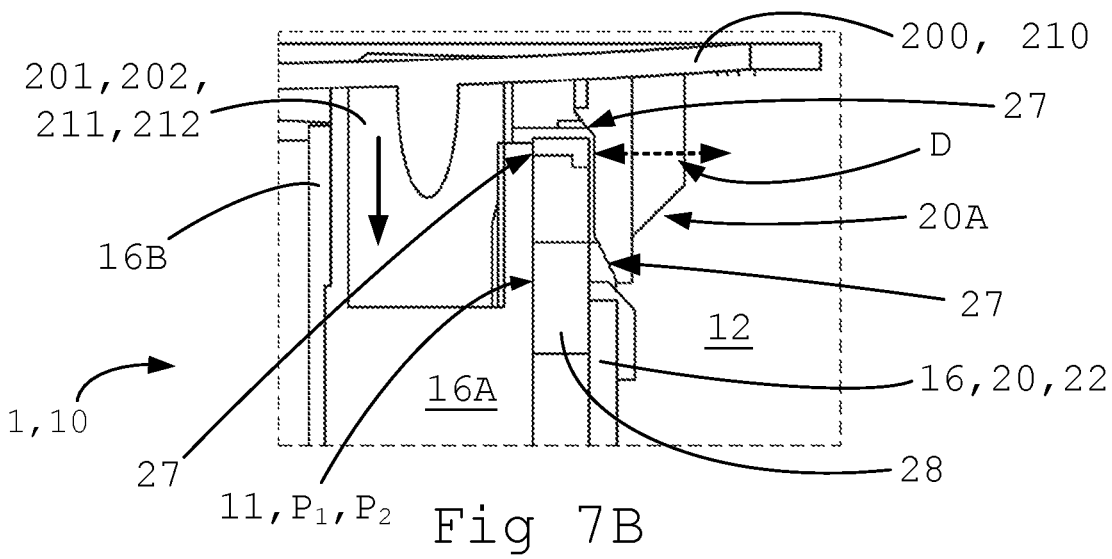
FIG. 7B shows a side plane view of a cross-section of a part of a hearing device charger (with a model specific insert) according to an embodiment of the present disclosure.
Figure 7C:
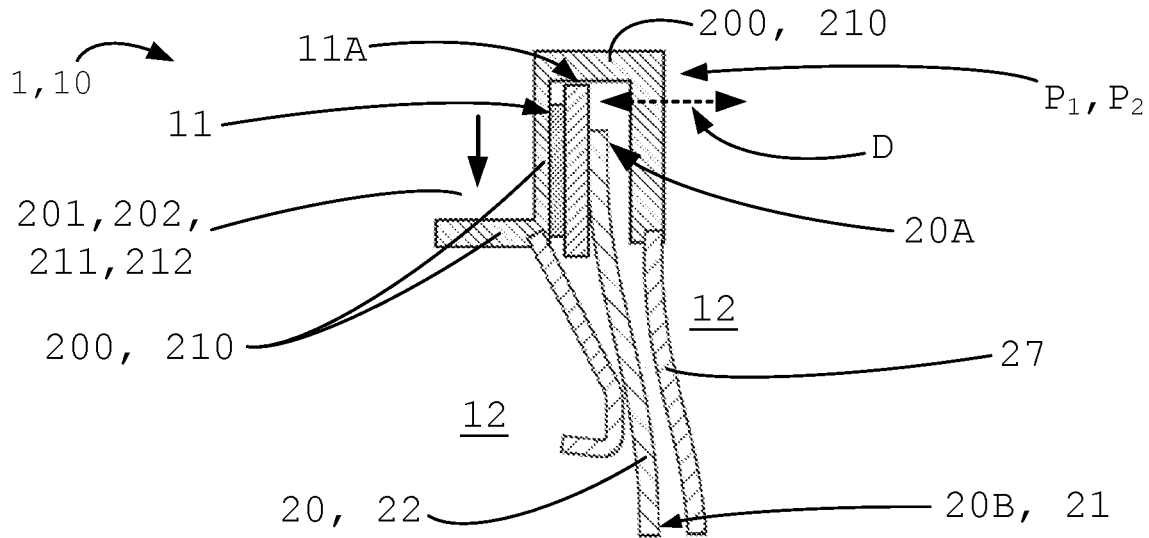
FIG. 7C shows a side plane view of a cross-section of a part of a hearing device charger (with a model specific insert) according to an embodiment of the present disclosure.

In some embodiments, see e.g. FIGS. 7A, 7B and 7C, the model specific insert 200, 210 comprises guiding surfaces 27 that engage the adjustable support 20 when inserted into the base charger 10, such that the transmitting charging element(s) 11 is/are biased or urged or pressed from the start/base position P towards the model specific insert(s) 200, 210 it/themselves and/or the cavity wall 202, 212 of the model specific insert(s) 200, 210 and/or the receiver charging element(s) 101, 111 into the first or second position $P_1$, $P_2$ enabling charging by the hearing device charger 1. The guiding surfaces 27 act as supports in some embodiments to facilitate insertion and holding of the model specific insert(s) 200, 210 in proper fit, alignment and position.

In some embodiments, see e.g. FIG. 12, where the elastic element 22 comprises or is made up of at least two upright elastic elongated arms or thin plates similar to leaf springs arranged in a sandwiched or laminated manner. In some embodiments, see e.g. FIGS. 7A to 9B, 10A, 10B, 11A, 11B, and 12, the elastic element 22 is made of metal or plastic or any combination of those materials, the same goes for the elastic element 22 when being a helical and/or leaf spring.

In some embodiments, the elastic element 22 is made as a double or twin or triple spring, e.g. a smaller helical spring within one or more larger helical springs and/or a metal elastic elongated arms or thin plates similar to leaf springs sandwiched over one or more other metal elastic elongated arms or thin plates similar to leaf springs and/or plastic elastic elongated arms or thin plates similar to leaf spring(s). In some embodiments, see e.g. FIGS. 8A to 9B, the elastic elongated arms or plates similar to leaf spring(s) 22 has/have a first free end 20A being made double, either "double-folded" or bent as in FIGS. 8C and 8D or shaped as a poker or hay- or pitchfork with two claws. In some embodiments, see e.g. FIGS. 10A and 10B, a larger part of the elastic element 22, here, also an elastic arm or thin plate similar to a leaf spring, is double-bent where a first upper part is attached to the elongated body of the adjustable support 20 to be able to bend while urging or biasing or moving or pushing or pulling the elongated body of the adjustable support 20 and at the same time moving the transmitter charging element 11 linearly towards or from the model specific insert(s) 200, 210 and/or the receiver charging element(s) 101, 111 as shown with the double arrow for urging direction D when placed therein as the elongated body is guided in guides 27 in the wall 16B of the frame 16 and the frame at each end 20A, 20B of the elongated body. Hence, these double-shaped and bent first free ends 20A of the elastic and elongated arm similar to leaf spring(s) 22 provides additional flexibility when the model specific insert(s) 200, 210 are inserted into the base charger 10 and thread past the adjustable support(s) 20 in a similar or same way as for all embodiments.

Hence, in some embodiments, the helical or leaf spring of the elastic element 22 is made of metal or plastic or any combination of those materials.

In some embodiments it is preferred that the elastic element 22 or at least parts of the elastic element 22 is made of metal, as metals are not exposed to creep (or permanent deformation over time due to an applied force), such as plastic materials may be. An elastic element 22 made of metal may thereby provide a more reliable bias or urging force urging the transmitter charging element(s) 11 against or towards one of the model specific inserts 200, 210 when the model specific insert is placed in the base charger 10, this both over time and if a model specific insert with larger cavity/-ies 201, 211 is replaced with a model specific insert with smaller cavity/-ies so that the distance $d_1$, $d_2$ the transmitter charging element(s) 11 is/are urged or bias becomes shorter. FIGS. 6A to 6C shows how the elastic element 22 may comprise a helical spring, which preferably may be made of metal. FIG. 7C shows an example of an elastic element 22 comprising an elastic arm which preferably may be made of metal. FIG. 12 shows how the elastic element 22 may comprise both a metal plate and an elastic arm made of plastic. The metal plate 22 may be added to support the elastic arm 22 made of plastic, wherein the metal plate is the thinner plate (to the right in FIG. 12) compared to the thicker elastic arm of plastic (to the left in FIG. 12).

In some embodiments, see e.g. FIGS. 11A to 12, the first free end 20A of the adjustable support 20 comprising the transmitter charging element 11 or the support plate 11A comprises a hinged or pivotable part 24 connecting the transmitter charging element(s) 11 or the support plate 11A to the first free end 20A of the adjustable support 20 via a pivot or hinge connection 24. In some embodiments, see e.g. FIGS. 13A to 13C, the second end 20B of the adjustable support 20 is pivotally attached to one or more attachments 21 of the frame 16 of the base charger 10 via one or more torsion hinges 24.

In some embodiments, see e.g. FIGS. 13A to 13C, the adjustable support 20 comprises a protruding member or arm or lever 25 arranged between the first free end 20A and the second end 20B. The adjustable support 20 may in this embodiment be an flexible arm being attached to the frame 16 of the base charger 10 by means of a hinge 24 and/or may be an elongated arm similar to a leaf spring protruding from or being attached to the frame 16 of the base charger 10. The adjustable support 20 may define an axis extending from the first free end 20A to the second end 20B. The protruding lever 25 may extend along a longitudinal axis being perpendicular or approximately perpendicular to the axis between the first free end 20A and the second end 20B. The protruding lever 25 is configured to be engaged by a lower part or bottom of any of the first or second model specific insert(s) 200, 210 when any of the first or second model specific insert(s) is introduced into the base charger 10 as visualized by the solid arrow of FIG. 13A pointing downwards. Hence, the first free end 20A is biased/urged with the transmitter charging element(s) 11 towards and/or against the model specific insert(s) and/or the associated receiver charging element 101, 111 by the protruding lever 25 working as a torque arm.

In some embodiments, see e.g. FIGS. 7A and 14, the adjustable support 20 comprises the compressible element 23 arranged at least partly between the first free end 20A and the transmitter charging element 11 to provide a flexibility and/or a tolerance adaptability and/or to exert a bias force urging the first free end 20A of the adjustable support and/or the transmitter charging element 11 away from each other, when the first or second model specific insert is not placed in the base charger 10, and/or towards the first or second model specific insert 200, 210, when the first or second model specific insert is placed in the base charger 10, in a direction being substantially in parallel with or in parallel with or inclined or substantially perpendicular or perpendicular to the direction of insertion of the first model specific insert and/or the second model specific insert. In some embodiments, see e.g. FIG. 7A, the adjustable support may comprise both the compressible element 23 and an elastic element 22, such as a spring (e.g. the elongated arm similar to a leaf spring or a helical spring). The compressible element 23 may possibly be used in most of the embodiments of the present disclosure but in some embodiments, the compressible element 23 is not always necessary to use.

In some embodiments, see e.g. FIGS. 6B, 8A and 8B, one or more weights 18 could be permanently fixed or integrated in the base charger 10 or be an optional entity and/or be a unit detachable from the base charger. The one or more weights 18 may preferably be arranged in the bottom part or bottom housing 15 of the base charger 10 to ensure stability of the hearing device charger 1 when standing on a table or any other substantial flat surface, so that the hearing device charger 1 do not tilt when subjected to a minor push or the like.

The hearing device charger 1 may comprise one or more control units 17 for controlling the functionality of the charging by being operatively connected to other components of the hearing device charger 1, the base charger 10 and its transmitter charging element(s) 11. The hearing device charger 1 and base charger 10 comprises one or more conduits or wiring for operative connection, e.g. electrical wiring or conduits 19, between the control unit 17 and the transmitter charging element(s) 11 and/or any other associated component required for control and powering of the charging. The electrical wiring 19 is in some embodiments accomplished by loose wiring to enable the flexibility and movement of the transmitter charging element(s) 11 when adapting to the different model specific insert(s) 200, 210 and/or the model specific hearing device(s) 100, 110. The control unit 17 for controlling the hearing device charger 1 is operatively connected to all necessary components, such as electronics and/or electronic circuits and mechanical devices incl. electrical switches, relays, integrated circuits, conduits, external power applications providing power to the hearing device charger 1 etc. However, these entities working together for the operation of the hearing device charger 1 are possible to implement by use of many different types of components and parts being common knowledge for a skilled person and are therefore not explained in detail herein. The control and charging control unit 17 for controlling the hearing device charger 1 and its charging are in some embodiments operatively connected to one or more built-in and rechargeable batteries to safely operate the hearing device charger 1 and/or charge the battery/-ies 102, 112 in each hearing device 100, 110 when the hearing device charger 1 is not connected to an external power source.

In some embodiments, the elastic element 22 works as or is a biasing organ.

In some embodiments, the transmitter charging element(s) 11 inside the cavity/-ies 12 of the base charger 10 is/are positioned and/or moved and/or displaced by one or more forces exerted by the insertion of the first model specific insert(s) 200 and/or the second model specific insert(s) 210 and/or by insertion of a third or fourth model specific insert 200 and/or fifth second model specific insert 210 or more.

In some embodiments, the base charger 10 is adapted to removable receive the first model specific insert(s) 200 having/for the first model specific hearing device(s) 100 to enable replacing the first model specific insert(s) with the second (and different) model specific insert(s) 210 having/for the second model specific hearing device(s) 110 comprising the second receiver charging element(s) 111.

In some embodiments, see e.g. FIGS. 6A to 6B, the adjustable support 20 comprises an elastic element 22 being a helical spring made of metal and the elongated body is a cylindrical pin or axle extending through the helical spring 22 giving better guidance/control of the movement of the adjustable support and the transmitter charging element(s) 11. This as the helical spring 22 made of metal is not exposed to creep (or permanent deformation over time due to an applied force) in the same manner as a plastic spring might be and the movement of the helical spring is guided/controlled by the cylindrical pin extending through the helical spring.

The person skilled in the art realizes that the present disclosure is not limited to the preferred embodiments described above. The person skilled in the art further realizes that modifications and variations are possible within the scope of the appended claims. Additionally, variations to the disclosed embodiments can be understood and effected by the skilled person in practicing the claimed disclosure, from a study of the drawings, the disclosure, and the appended claims. The specification and drawings are, accordingly to be regarded in an illustrative rather than restrictive sense. The claimed invention is intended to cover all alternatives, modifications and equivalents.

Items

Item 1. A charging kit 1 for charging one or more rechargeable hearing devices 100,110, the hearing device(s) being configured to be worn by a user, the charging kit comprising a base charger 10 being configured to receive a first model specific insert 200, the base charger comprising a transmitter charging element 11, where the first model specific insert is adapted to removably receive at least a first model specific hearing device 100 of the one or more hearing devices, the first model specific hearing device comprising a first receiver charging element 101, characterized in that the transmitter charging element 11 is arranged in the base charger 10 on an adjustable support 20 being configured to provide an adaptable positioning of the transmitter charging element, whereby the transmitter charging element is configured to be urged towards the first model specific insert when the first model specific insert is placed in the base charger thereby enabling energy to be transferrable from the transmitter charging element to the first receiver charging element 101 of the first model specific hearing device 100 when placed in the first model specific insert.

Item 2. The charging kit 1 according to item 1, the base charger 10 being configured to receive a second model specific insert 210, wherein the second model specific insert is adapted to removably receive at least a second model specific hearing device 110 of the one or more hearing devices, the second model specific hearing device comprising a second receiver charging element 111, and wherein the adjustable support 20 of the transmitter charging element 11 is adapted to provide the adaptable positioning of the transmitter charging element, so that the transmitter charging element is configured to be urged towards the second model specific insert 210 when the second model specific insert is placed in the base charger enabling energy to be transferrable from the transmitter charging element to the second receiver charging element 111 of the second model specific hearing device 110 when the second model specific hearing device is placed in the second model specific insert.

Item 3. The charging kit 1 according to any preceding item, wherein the base charger 10 comprises a cavity 12 configured to mate with the first model specific insert 200 and/or the second model specific insert 210, and/or each model specific insert comprises at least one model specific insert cavity 201, 211 configured to mate with the first or second model specific hearing device 100, 110, respectively.

Item 4. The charging kit 1 according to any preceding item, wherein the first and/or second model specific insert 200, 210 comprises two model specific insert cavities 201, 211 of which each model specific insert cavity 201, 211 is configured to mate with one of a pair of the first model specific hearing devices 100 or to mate with one of a pair of the second model specific hearing devices 110.

Item 5. The charging kit 1 according to any preceding item, wherein at least one of the first model specific hearing devices 100 and/or at least one of the second model specific hearing devices 110 is configured for wireless charging.

Item 6. The charging kit 1 according to any preceding item, wherein one or more or all of the first and/or the second model specific hearing devices 100, 110 is/are inductively chargeable.

Item 7. The charging kit 1 according to item 3 or any of items 4 to 6 when dependent on item 3, wherein the transmitter charging element 11 is arranged to be positioned at a start position P in the cavity 12 of the base charger 10 before the first model specific insert 200 is placed in the base charger, and the transmitter charging element is configured to be displaced to a first position $P_1$ by the first model specific insert and to act with a urging force towards the first model specific insert 200 when the first model specific insert is placed in the base charger, the first position $P_1$ being different from the start position P.

Item 8. The charging kit 1 according to item 7, wherein the transmitter charging element 11 is configured to be displaced to the first position $P_1$ to align with the first receiver charging element 101 of the first model specific hearing device 100, when the first model specific hearing device is placed in the first model specific insert 200 in the base charger 10, and to act with a urging force towards the first model specific insert 200 and the first receiver charging element of the first model specific hearing device.

Item 9. The charging kit 1 according to item 7 or 8, wherein the transmitter charging element 11 is arranged to be positioned at the start position P in the cavity 12 of the base charger 10 before the second model specific insert 210 is placed in the base charger, and the transmitter charging element 11 is configured to be displaced to a second position $P_2$ by the second model specific insert and to act with a urging force towards the second model specific insert when the second model specific insert is placed in the base charger, the second position $P_2$ being different from the start position P.

Item 10. The charging kit 1 according to item 9, wherein the transmitter charging element 11 is configured to be displaced to the second position $P_2$ to align with the second receiver charging element 111 of the second model specific hearing device 110, when the second model specific hearing device is placed in the second model specific insert 210 in the base charger 10, and to act with a urging force towards the second model specific insert and the second receiver charging element of the second model specific hearing device.

Item 11. The charging kit 1 according to any of items 7 to 10, wherein the first distance d 1 between the start position P and the first position $P_1$ is shorter, equal to or longer than the second distance $d_2$ between the start position P and the second position $P_2$.

Item 12. The charging kit 1 according to any of items 1 to 11, wherein the adjustable support 20 comprises an elastic element 22 configured to make the transmitter charging element(s) 11 of the base charger 10 movable between different positions P, $P_1$, $P_2$ in the base charger and able to act with a urging force towards or against or into contact with the first model specific insert 200 or the second model specific insert 210 when the first or second model specific insert is placed in the base charger.

Item 13. The charging kit 1 according to item 12, wherein the elastic element 22 of the adjustable support 20 make the transmitter charging element(s) 11 of the base charger 10 movable between different positions P, $P_1$, $P_2$ in the base charger, when the first or second model specific hearing device 100, 110 is placed in the first or second model specific insert 200, 210 in the base charger, and able to act with a urging force towards or against or into contact with the first receiver charging element of the first model specific hearing device, when the first model specific hearing device is placed in the first model specific insert 200 in the base charger, and able to act with a urging force towards or against or into contact with the second receiver charging element of the second model specific hearing device, when the second model specific hearing device is placed in the second model specific insert 210 in the base charger.

Item 14. The charging kit 1 according to any of items 3 to 13, wherein the adjustable support 20 comprises an elongated body with a first free end 20A and a second end 20B opposite the first free end, whereby the transmitter charging element 11 is arranged on the first free end 20A of the adjustable support and the second end 20B of the adjustable support is attached to a guide 27 or attachment point 21 in the base charger 10, and the first free end of the adjustable support is arranged movable/displaceable in the cavity 12 of the base charger 10.

Item 15. The charging kit 1 according to item 14 and item 12, wherein the elongated body of the adjustable support 20 comprises or is the elastic element 22.

Item 16. The charging kit 1 according to item 14, wherein the adjustable support 20 comprises an elastic element 22 arranged at least partly between the first free end 20A and the second end 20B to exert a push force urging the first free end of the adjustable support and/or the transmitter charging element(s) 11 inside the base charger 10 in a direction being substantially perpendicular or perpendicular to the direction of insertion of the first model specific insert 200 and/or the second model specific insert 210.

Item 17. The charging kit 1 according to any of items 14 to 16, wherein the base charger 10 comprises one or more insert receiving cavities 16A, whereby the first free end 20A of the adjustable support 20 and/or the transmitter charging element(s) 11 are/is arranged at least partly in or fully outside the insert receiving cavity/-ies 16A of the base charger 10.

Item 18. The charging kit 1 according to any of items 14 to 17, wherein each of the model specific insert cavities 201, 211 of first or second model specific inserts 200, 210 is defined by an insert cavity wall 202, 212, wherein each insert cavity 201, 211 comprises one or more through holes 203, 213, wherein the first free end 20A of the adjustable support 20 and/or the transmitter charging element(s) 11 are/is arranged at least partly in one or more of the through holes when one of the first and/or second model specific inserts is placed in the base charger 10.

Item 19. The charging kit 1 according to any of items 16 to 18 when item 17 or 18 depends on item 16, wherein the elastic element 22 of the adjustable support 20 is arranged at least partly restrained between the first free end 20A and the second end 20B to be pre-tensioned to exert the urging force.

Item 20. The charging kit 1 according to any of items 14 to 19 when dependent on item 12 or 16, wherein the elastic element 22 is configured to extend along the elongated body of the adjustable support 20 and to enclose or encompass or surround or cover at least a part of the outer surface of the elongated body of the adjustable support.

Item 21. The charging kit 1 according to any of items 12 to 20 when items 17 to 19 depend on item 12, wherein the elastic element 22 comprises at least one helical spring or at least one leaf spring or the elastic element is made up of at least one helical spring or at least one leaf spring.

Item 22. The charging kit 1 according to any of items 12 to 21 when item 17 or 18 depends on item 12 or 16, wherein the elastic element(s) 22 comprise(s) or is/are made up of at least two leaf springs arranged in a sandwiched or laminated manner.

Item 23. The charging kit 1 according to any of items 12 to 22 when item 17 or 18 depends on item 12 or 16, wherein the elastic element(s) 22 is/are made of metal or plastic or any combination of those materials.

Item 24. The charging kit 1 according to any of items 21 to 23, wherein the helical or leaf spring of the elastic element 22 is made of metal or plastic or any combination of those materials.

Item 25. The charging kit 1 according to any of items 14 to 24, wherein the first free end 20A of the adjustable support 20 comprising the transmitter charging element(s) 11 is a hinged or pivotable part 24 of the elongated body of the adjustable support.

Item 26. The charging kit 1 according to any of items 14 to 25, wherein the transmitter charging element 11 is connected to the first free end 20A of the adjustable support 20 via a pivot or hinge 24.

Item 27. The charging kit 1 according to any of items 14 to 26, wherein the adjustable support 20 comprises a protruding member or arm or lever 25 arranged between the first free end 20A and the second end 20B, the protruding member being configured to be engaged by any of the first or second model specific insert 200, 210 when any of the first or second model specific insert is introduced into the base charger 10, whereby the first free end and the transmitter charging element(s) 11 are urged towards the model specific insert.

Item 28. The charging kit 1 according to item 27, wherein the second end 20B of the adjustable support 20 is pivotally attached to the frame 16 of base charger 10 via a torsion hinge 24.

Item 29. The charging kit 1 according to any of items 14 to 28, wherein the adjustable support 20 comprises a compressible element 23 arranged at least partly between the first free end 20A and the transmitter charging element 11 to provide a flexibility and/or a tolerance adaptability and/or to exert a urging force urging the first free end of the adjustable support and/or the transmitter charging element 11 away from each other and/or towards the first or second model specific insert 200, 210, when the first or second model specific insert is placed in the base charger, in a direction being substantially perpendicular or perpendicular to the direction of insertion of the first model specific insert and/or the second model specific insert.

LIST OF REFERENCES

1: Charging kit/assembly/device. 10: Base charger with housing. 11: Transmitter charging element of base charger. 11A: Support plate. 12: Cavity/-ies of base charger. 13: Attachment/-s for attaching model specific inserts to base charger. 13A: Attachment/-s of base charger for holding of parts making it up. 14: Top housing of base charger. 15: Bottom housing of base charger. 16: Frame of base charger. 16A: Insert cavity. 16B: Insert guide/Insert guide wall. 16C: Through hole(s) of insert guide/insert guide wall 16B. 17: Operational device/Controller/Control unit of base charger comprising electronics, e.g. one or more printed circuit boards, power supplies, conduits, switches etc. 18: Weight that could be permanently fixed or integrated in the base charger or be an optional entity and/or be a unit detachable from the base charger. 19: Conduits to/from controller 17.

20: Adjustable/Adaptable support/structure of transmitter charging element. 20A: First free end of adjustable/adaptable support/arrangement 20. 20B: Second end of adjustable or adaptable support/arrangement 20. 21: Attachment point of support 20. 22: Elastic element of the adjustable support, such as an elastic arm, a spring (e.g. a helical spring made of plastic or metal) or a leaf spring. 22A: First end of helical spring 22. 22B: Second end of helical spring 22. 23: Compressible element of the adjustable support, such as rubber or foam in the form of a plate/pad, e.g. made of Poron®, or just a hard or stiff spacer or the like or part of the support being hard or stiff. 24: Hinge/Pivot of adjustable support, e.g. a living hinge or torsion hinge. 25: Protruding arm/lever of adjustable support. 26: Shoulder on support 20. 27: Guide of support 20. 28: Holder of transmitter charging element 11. 29: Flange/edge of holder 28.

100: First model(s)/group(s) specific hearing device(s). 101: First receiver charging element. 102: Rechargeable battery of the first hearing device(s) 100. 103: BTE housing of the first hearing device(s) 100. 104: Hook or ear plug of the first hearing device(s) 100.

110: Second model(s)/group(s) specific hearing device(s). 111: Second receiver charging element. 112: Rechargeable battery of the second hearing device(s) 110. 113: BTE housing of the second hearing device(s) 110. 114: Hook or ear plug of the second hearing device(s) 110.

200: First model(s)/group(s) specific insert. 201: Model specific cavity/-ies of first model(s)/group(s) specific insert. 202: Cavity wall(s) of cavity/-ies 201. 203: Through hole(s) of cavity wall(s) 202. 204: Guide element(s) of first model(s)/group(s) specific insert.

210: Second model(s)/group(s) specific insert. 211: Model specific cavity/-ies of second model(s)/group(s) specific insert. 212: Cavity wall(s) of cavity/-ies 211. 213: Through hole(s) of cavity wall(s) 212. 214: Guide element(s) of second model(s)/group(s) specific insert.

D: Direction of urging of the transmitter charging element 11. P: Start position of transmitter charging element. $P_1$: First position of transmitter charging element. $P_2$: Second position of transmitter charging element. $d_1$: First distance. $d_2$: Second distance.

The invention claimed is:

1. A charging kit for charging a first hearing device that is configured to be worn by a user, the charging kit comprising:
a base charger configured to receive a first insert, the base charger comprising a transmitter charging element, wherein the first insert is configured to removably receive the first hearing device, the first hearing device comprising a first receiver charging element;
wherein the transmitter charging element of the base charger is at or coupled to an adjustable support, the adjustable support configured to provide an adaptable positioning for the transmitter charging element, wherein the transmitter charging element is configured to be urged towards the first insert when the first insert is received by the base charger thereby allowing energy to be provided from the transmitter charging element to the first receiver charging element of the first hearing device when the first hearing device is received by the first insert; and
wherein at least a part of the first insert is between the first hearing device and the transmitter charging element when the first insert receives the first hearing device.

2. The charging kit according to claim 1, wherein the base charger is configured to receive a second insert, wherein the second insert is configured to removably receive a second hearing device, the second hearing device comprising a second receiver charging element.

3. The charging kit according to claim 2, wherein the transmitter charging element is configured to be urged towards the second insert when the second insert is received by the base charger.

4. The charging kit according to claim 2, wherein the base charger comprises a cavity configured to accommodate the first insert and/or the second insert.

5. The charging kit according to claim 1, wherein the transmitter charging element is not in physical contact with the first receiver charging element when the charging kit is charging the first hearing device.

6. The charging kit according to claim 1, further comprising a spring or an elastic element configured to urge both the adjustable support and the transmitter charging element towards the first insert.

7. The charging kit according to claim 1, wherein the base charger comprises a housing, and wherein the adjustable support is configured to translate rectilinearly relative to the housing.

8. The charging kit according to claim 1, wherein the first insert comprises a first surface to interface with the first hearing device, and a second surface opposite from the first surface, and wherein the adjustable support is configured to move towards the second surface of the first insert.

9. The charging kit according to claim 1, wherein the base charger comprises a housing, wherein the transmitter charging element is contained inside the housing.

10. The charging kit according to claim 1, wherein the base charger is configured to wirelessly charge the first hearing device.

11. A charging kit for charging a first hearing device that is configured to be worn by a user, the charging kit comprising:
a base charger configured to receive a first insert, the base charger comprising a transmitter charging element, wherein the first insert is configured to removably receive the first hearing device, the first hearing device comprising a first receiver charging element;
wherein the transmitter charging element of the base charger is at or coupled to an adjustable support that is configured to provide an adaptable positioning for the transmitter charging element, wherein the transmitter charging element is configured to be urged towards the first insert when the first insert is received by the base charger thereby allowing energy to be provided from the transmitter charging element to the first receiver charging element of the first hearing device when the first hearing device is received by the first insert;
wherein the base charger comprises a cavity;
wherein the transmitter charging element is at a start position in the cavity of the base charger before the first insert is received by the base charger; and
wherein the transmitter charging element is at a first position when the first insert is received by the base charger, the first position being different from the start position.

12. The charging kit according to claim 11, wherein the cavity of the base charger is configured to receive a second insert, wherein the second insert is configured to removably receive a second hearing device, the second hearing device comprising a second receiver charging element.

13. A charging kit for charging a first hearing device that is configured to be worn by a user, the charging kit comprising:
- a base charger configured to receive a first insert, the base charger comprising a transmitter charging element, wherein the first insert is configured to removably receive the first hearing device, the first hearing device comprising a first receiver charging element;
- wherein the transmitter charging element of the base charger is at or coupled to an adjustable support that is configured to provide an adaptable positioning for the transmitter charging element, wherein the transmitter charging element is configured to be urged towards the first insert when the first insert is received by the base charger thereby allowing energy to be provided from the transmitter charging element to the first receiver charging element of the first hearing device when the first hearing device is received by the first insert;
- wherein the adjustable support comprises an elastic element, and wherein the transmitter charging element of the base charger is movable between different positions.

14. The charging kit according to claim 13, wherein the elastic element is configured to provide an urging force towards the first insert when the first insert is received by the base charger.

15. A charging kit for charging a first hearing device that is configured to be worn by a user, the charging kit comprising:
- a base charger configured to receive a first insert, the base charger comprising a transmitter charging element, wherein the first insert is configured to removably receive the first hearing device, the first hearing device comprising a first receiver charging element;
- wherein the transmitter charging element of the base charger is at or coupled to an adjustable support that is configured to provide an adaptable positioning for the transmitter charging element, wherein the transmitter charging element is configured to be urged towards the first insert when the first insert is received by the base charger thereby allowing energy to be provided from the transmitter charging element to the first receiver charging element of the first hearing device when the first hearing device is received by the first insert;
- wherein the adjustable support comprises a first end and a second end opposite the first end, the transmitter charging element being at or coupled to the first end of the adjustable support, wherein the base charger comprises a housing, and wherein the first end of the adjustable support is movable relative to the housing of the base charger; and
- wherein the adjustable support comprises an elastic element.

16. The charging kit according to claim 15, wherein the elastic element comprises at least one helical spring.

17. The charging kit according to claim 15, wherein the adjustable support also comprises a body, and wherein the elastic element is configured for enclosing or encompassing or surrounding or covering at least a part of an outer surface of the body.

18. The charging kit according to claim 15, wherein the transmitter charging element is connected to the first end of the adjustable support via a pivot or hinge.

19. The charging kit according to claim 15, wherein the second end of the adjustable support is attached to a guide or attachment point in the base charger.

* * * * *